United States Patent
Sun

(10) Patent No.: US 9,347,823 B2
(45) Date of Patent: May 24, 2016

(54) ABSOLUTE MEASUREMENT METHOD AND APPARATUS THEREOF FOR NON-LINEAR ERROR

(71) Applicant: National Institute of Metrology, P.R.China, Beijing (CN)

(72) Inventor: Ruoduan Sun, Beijing (CN)

(73) Assignee: NATIONAL INSTITUTE OF METROLOGY, Beijing (CN)

( * ) Notice: Subject to any disclaimer, the term of this patent is extended or adjusted under 35 U.S.C. 154(b) by 282 days.

(21) Appl. No.: 14/166,796

(22) Filed: Jan. 28, 2014

(65) Prior Publication Data
US 2015/0009501 A1  Jan. 8, 2015

(30) Foreign Application Priority Data
Jul. 4, 2013  (CN) .......................... 2013 1 0279839

(51) Int. Cl.
*G01J 1/10* (2006.01)
*G01J 1/02* (2006.01)
*G01J 3/02* (2006.01)
*G01J 1/04* (2006.01)

(52) U.S. Cl.
CPC .............. *G01J 1/0295* (2013.01); *G01J 1/0437* (2013.01); *G01J 1/0462* (2013.01); *G01J 3/0229* (2013.01); *G01J 3/0254* (2013.01); *G01J 3/0297* (2013.01)

(58) Field of Classification Search
USPC ........... 356/243.1, 243.4, 247, 255, 405, 445, 356/402, 237.1–237.2, 239.7, 614–616, 356/619–623, 600, 601
See application file for complete search history.

(56) References Cited

U.S. PATENT DOCUMENTS 4,059,357 A  11/1977 Klein

*Primary Examiner* — Tri T Ton
(74) *Attorney, Agent, or Firm* — Gokalp Bayramoglu

(57) ABSTRACT

The present invention discloses a method for measuring absolute value of non-linear error and an apparatus thereof. The method comprises: placing N reflecting plates jointed together at the sample port of the optical measuring instrument at the same time, wherein each of reflecting plate has a same covering area at the sample port; placing an aperture along light paths of the optical measuring instrument; adjusting the number of reflecting plates as used according to a position in the measuring range of the optical measuring instrument where the non-linear error is required to be measured; following every adjustment, acquiring the output results when the adjusted reflecting plates are placed at the sample port; performing a computation processing for non-linear error to the output results; and acquiring the non-linear error of the output results of the optical measuring instrument.

12 Claims, 13 Drawing Sheets

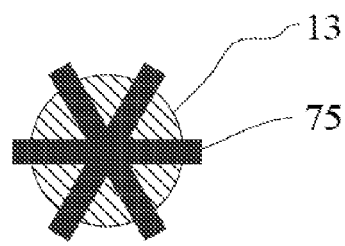
Fig. 11
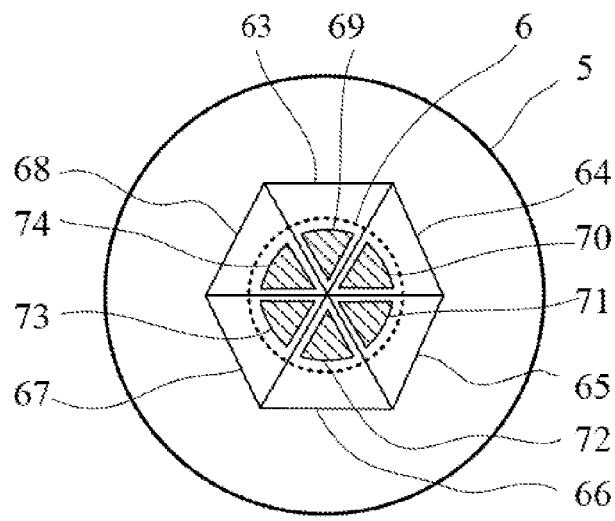
Fig. 12
Fig. 13

ABSOLUTE MEASUREMENT METHOD AND APPARATUS THEREOF FOR NON-LINEAR ERROR

FIELD OF THE INVENTION

The present invention relates to the technical field of the optical precise metrology, and more particularly to an absolute measurement method and apparatus thereof for non-linear error.

BACKGROUND OF THE INVENTION

The non-linear error is an important performance indication for a measuring instrument and directly correlates with the output result of the instrument. In the technical field of the precise metrology, the measuring instrument is generally calibrated by a zero calibration and a known optical amount of standard sample calibration; and then calculates the measurement results in accordance with the ratio of the measurement signals of measured sample to standard sample. However, during this process, the non-linear error of the measuring instrument directly causes the indeterminacy of the measurement results. Therefore, in the field of precise metrology, there is a need to precisely measure and calibrate the non-linear error of the instrument for ensuring the accuracy of the measurement results.

Conventional measurement methods for the non-linear error of an optical measuring instrument are as follows:

G. L. Klein has proposed a relatively common method for measuring non-linear error in U.S. Pat. No. 4,059,357 "Densitometer calibrated reference standard", in which the non-linear error of the instrument may be measured and calibrated by using a group of samples with known parameters. This method belongs to a relative measurement method.

H. Bennett has proposed a highly precise measurement method for the non-linear error by rotating a polarizer to attenuate a light source, in an article "Accurate method for determining photometric linearity". This method is not dependent on the accuracy of the nominal value of a sample, but it utilizes a precise mechanism to cause high performance polarizer to rotate, and achieves a precise attenuation of the intensity of the light source. This method belongs to an absolute measurement method for non-linear error. The measurement accuracy of the non-linear error would be restricted by the degree of polarization of the polarizer and the accuracy of the mechanically rotational angle. The measurement accuracy for the non-linearity of a detector can reach approximately 0.1%.

C. Sanders has proposed a double-apertures superposition method in an article "A photocell linearity tester". The principle of the method is as follow: the light source may be divided into two parts by a double-apertures; the detector of the optical measuring instrument may respond to light sources $\Phi1$ and $\Phi2$ as $\rho1$ and $\rho2$, respectively; and output $\rho_{all}$ as respond to $\Phi1+\Phi2$; if $\rho1+\rho2 \neq \rho_{all}$, then the optical measuring instrument has non-linear error. This method belongs to an absolute measurement method for non-linear error.

Non-linear error of the optical measuring instrument may be caused by many factors such as detector, integrating sphere, light path and so on. The measurement method for non-linear error, proposed by G. L. Klein, uses the samples with known parameters to perform the measurement of non-linear error. This method may comprehensively consider non-linear error for the measuring results of the whole optical measuring instrument, but its accuracy would be restricted by the indeterminacy of the nominal value, and thus it is difficult for improving the measurement accuracy of non-linear error. The polarizing method proposed by H. Bennett and the aperture method proposed by C. Sanders may change the reflectance or the colorimetric values in different areas of a sample port of an instrument by attenuating the intensity of the light source. Although the polarizing method and the aperture method may have a relatively high measurement precision for non-linear error of the optical measuring instrument, taking the reflectance measuring instrument as an example, the reflectance of the element to be measured may influence the transmission efficiency and light distribution of the integrating sphere in the light path, which may bring non-linear error. For such instruments, since the double-apertures method can only modulate the light source, it could only achieve an absolute measurement for the non-linear error of a detector in an optical measuring instrument, and could not achieve a non-linear measurement for final output results of an optical measuring instrument.

To sum up, a technical problem required to address urgently by those skilled in the art is how to achieve a non-linear error measurement for final outputting results of an optical measuring instrument and ensure the accuracy of the non-linear error measurement.

SUMMARY OF THE INVENTION

The present invention discloses an absolute measurement method and an apparatus for non-linear error, which may achieve a non-linear error measurement for final outputting results of an optical measuring instrument while ensuring the accuracy of the non-linear error measurement.

To address the above problem, the present invention discloses an absolute measurement method for non-linear error, comprising: placing N reflecting plates jointed together at a sample port of an optical measuring instrument at the same time, wherein each of reflecting plates has a same covering area at the sample port and N is a natural number more than or equal to 2; placing a aperture along the light paths of the optical measuring instrument; forming N optical regions corresponding to N reflecting plates at the sample port, wherein none of the N optical regions cover the edges of the reflecting plates; adjusting the number of the reflecting plates as used according to a position in the measuring range of the optical measuring instrument where the non-linear error is required to be measured; acquiring the output results of the optical measuring instrument when the adjusted reflecting plates are placed at the sample port following every adjustment; performing a computation processing for non-linear error to the output results; and acquiring the non-linear error of the output results of the optical measuring instrument.

To address the above problem, the present invention also discloses an absolute measurement apparatus for the non-linear error, comprising: N reflecting plates and a aperture, wherein N is a natural number more than or equal to 2;

wherein the N reflecting plates are configured to be jointed together and then placed at a sample port of an optical measuring instrument at the same time; wherein each reflecting plate has a same covering area at the sample port; the aperture is configured to be disposed on a light path of the optical measuring instrument; N optical regions corresponding to the N reflecting plates are formed at the sample port, wherein none of N optical regions cover the edges of the reflecting plates; and when the non-linear error is required to be measured by the optical measuring instrument, the number of the reflecting plates are adjusted according to a position in the measuring range of the optical measuring instrument where the non-linear error is required to be measured, then the reflecting plates are placed at the sample port; following every adjustment, the optical measuring outputs an output result when the adjusted reflecting plates being placed at the sample port, such that a computation processing for non-linear error is performed to the output result for acquiring the non-linear error of the output result of the optical measuring instrument.

In comparison with the prior art, the present invention has following advantages:

By placing N reflecting plates in the measuring apparatus for non-linear error, the absolute measurement method and apparatus for non-linear error provided in this invention can accomplish an absolute measurement for the non-linear error of the output results of various optical measuring instruments such as a reflectance measuring instrument, a chromaticity measuring instrument and a whiteness meter and so on. In the absolute measurement of the this invention, the reflectance or the chromatic value or the whiteness value in different regions of the sample port of instrument can be directly changed by setting the number of the reflecting plates; and the non-linear error of the output results can be computed by using superposition principle through several measurements, instead of measuring the non-linear error by using the samples with known parameters whereby avoiding the difficulty in improving the measurement precision of the non-linear error due to the indeterminacy of the nominal values of samples. This absolute measurement comprehensively considers the influence of the non-linear error which is introduced into the measurement results due to various factors such as light path, detector and integrating sphere. Therefore, it can accomplish the measurement for the non-linear error of the final output results of the optical measuring instrument while ensuring the accuracy of the non-linear error measurement.

DESCRIPTION OF THE DRAWINGS

FIG. 11 is a schematic view showing the position where a "*" shaped aperture in the apparatus as illustrated in FIG. 2 is located, according to the fourth embodiment of the present invention:

FIG. 12 is a schematic view showing the lighting regions of six reflecting plates in the apparatus as illustrated in FIG. 2, according to the fourth embodiment of the present invention;

FIG. 13 is a view showing an absolute measurement apparatus in which the reflectance measuring instrument under 0:d condition measures non-linear error of reflectance factors of the reflectance measuring instrument using two reflecting plates, according to a fifth embodiment of the present invention;

DESCRIPTION OF THE PREFERRED EMBODIMENT

The foregoing objects, features and advantages of the present invention will become more apparent from the following detailed description of the present invention when taken in conjunction with the accompanying drawings.

Embodiments of the present invention will now be further described in detail with reference to the accompanying drawings.

First Embodiment

Figure 1:
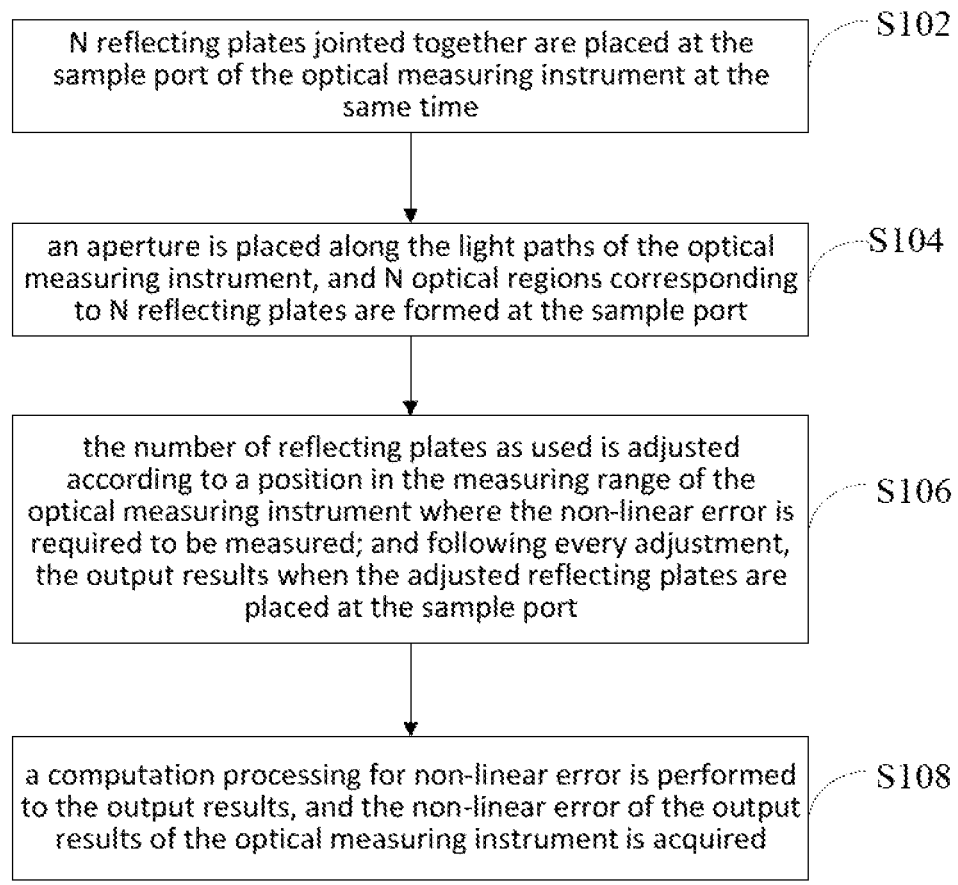
FIG. 1 illustrates a flow chart showing steps of an absolute measurement method for the non-linear error according to a first embodiment of the present invention.

Referring to FIG. 1, a flow chart of an absolute measurement method for non-linear error according to a first embodiment of the present invention is illustrated.

The absolute measurement method for non-linear error according to the first embodiment of the present invention may comprise the following steps:

Step S102, N reflecting plates jointed together are placed at the sample port of the optical measuring instrument at the same time.

N is a natural number more than or equal to 2 and preferably less than or equal to 100.

Each reflecting plate has a same covering area at the sample port. The optical measuring instrument includes but is not limited to a reflectance measuring instrument, a chromaticity measuring instrument or a whiteness meter.

Step S104, an aperture is placed along the light paths of the optical measuring instrument, and N optical regions corresponding to N reflecting plates are formed at the sample port.

None of N optical regions cover the edges of the reflecting plates outside the sample port. In the case that the optical measuring instrument is a reflectance measuring instrument, a chromaticity measuring instrument or a whiteness meter, disposing the aperture on luminous light paths and/or detecting light paths of the light paths of the reflectance measuring instrument, the chromaticity measuring instrument or the whiteness meter, where an integrating sphere is not disposed; and N lighting regions or detecting regions corresponding to N reflecting plates are formed at the sample port. When the aperture is disposed on the luminous light paths without integrating sphere, each of N lighting regions corresponding to N reflecting plates has a same area and illumination intensity. When the aperture is disposed on detecting light paths without integrating sphere, each N detecting region corresponding to N reflecting plates has a same area and detecting sensitivity.

Step S106, the number of reflecting plates as used may be adjusted according to a position in the measuring range of the optical measuring instrument where the non-linear error is required to be measured; and following every adjustment, the output results are acquired when the adjusted reflecting plates are placed at the sample port.

The step of adjusting the number of reflecting plates as used according to a position in the measuring range of the optical measuring instrument where the non-linear error is required to be measured, comprising:

The N reflecting plates jointed together are grouped and placed at the sample port firstly; when a non-linear error at a 1/M position of the measuring range of the optical measuring instrument is measured, N reflecting plates are then divided into M groups, each of which has N/M reflecting plates; M groups of reflecting plates are disposed at the sample port sequentially, wherein N/M reflecting plates in each of M groups are placed in specified positions at the sample port. Or, when a non-linear error at a 1/M position of the measuring range of the optical measuring instrument is measured; N reflecting plates are divided into M groups firstly, each of which has N/M reflecting plates; M groups of reflecting plates are disposed at the sample port sequentially, wherein N/M reflecting plates in each of M groups are placed in specified positions at the sample port; the N reflecting plates jointed together are then grouped and placed at the sample port. Wherein N is integer times of M; the specified positions are positions where the N/M reflecting plates of each of M groups located in N reflecting plates when e N reflecting plates jointed together are placed at the sample port of the optical measuring instrument simultaneously. In this manner, a lower limit of the measuring range is defined by an output result of the optical measuring instrument with no reflecting plate placed; and an upper limit of the measuring range is defined by an output result of the optical measuring instrument when N reflecting plates jointed together are placed at the sample port of the optical measuring instrument at the same time.

Step S108, a computation processing for non-linear error is performed to the output results, and the non-linear error of the output results of the optical measuring instrument is acquired.

In the case that the optical measuring instrument is a reflectance measuring instrument, the output results may include a reflectance, a diffuse reflectance, or a reflectance factor; in the case that the optical measuring instrument is a chromaticity measuring instrument, the output results may include the a tristimulus value; in the case that the optical measuring instrument is a whiteness meter, the output results may include a whiteness value.

Wherein, the reflectance refers to a ratio of the luminous flux reflected by the sample to the incident flux; the diffuse reflectance refers to a ratio of the diffuse reflectance component in the luminous flux reflected by the sample to the incident flux; the reflectance factor refers to a ratio of the luminous flux reflected in a direction defined by a specified taper cone to the luminous flux of an ideal diffuse reflector in the same direction; the tristimulus value refers to, in a trichromatic system, the three primary colors stimulating amount as required to reach the color matching with the light to be measured; and the whiteness value refers to the degree to which a surface is white in colorimetry.

It should be understood, the performance of a non-linear error computation processing to the output results to acquire the non-linear error of the output results of the optical measuring instrument can be achieved by manual work or by a control module in a corresponding apparatus such as an optical measuring instrument.

In this embodiment, by placing N reflecting plates in the measuring apparatus for non-linear error, the absolute measuring method for the non-linear error can accomplish an absolute measurement for the non-linear error of the output results of various optical measuring instruments such as a reflectance measuring instrument, a chromaticity measuring instrument and a whiteness meter and so on. In the absolute measurement of the this embodiment, the reflectance or the chromatic value or the whiteness value in different regions of the sample port of instrument can be directly changed by setting the number of the reflecting plates; and the non-linear error of the output results can be computed by using superposition principle through several measurements, instead of measuring the non-linear error by using the samples with known parameters; whereby avoiding the difficulty in improving the measurement precision of the non-linear error due to the indeterminacy of the nominal values of samples. This absolute measurement comprehensively considers the influence of the non-linear error which is introduced into the measurement results due to various factors such as light path, detector and integrating sphere. Therefore, it can accomplish the measurement for the non-linear error of the final output results of the optical measuring instrument while ensuring the accuracy of the non-linear error measurement.

Preferably, the following processes may be implemented after step S102 and before starting the measurement: a light trap may be disposed on the reflecting plates for covering the sample port and the reflecting plates. By disposing the light trap on the reflecting plates, the light transmitted through the hollowed-out portion of the sample port could be absorbed. This may avoid the light reflection on the hollowed-out portion of the sample port, so that the non-linear error of the output results of the optical measuring instrument as measured becomes more accurate.

Second Embodiment

A measurement method for non-linear error according to this embodiment will be explained with reference to FIGS. 2 and 3 below.

Figure 2:
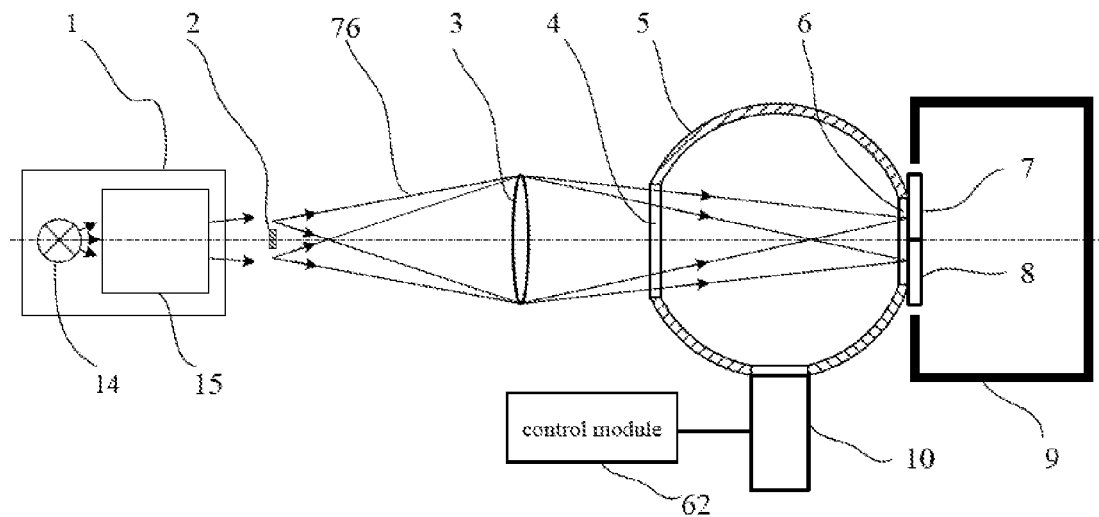
FIG. 2 illustrates an absolute measurement apparatus in which reflectance measuring instrument under 0:d condition measures the non-linear error of the reflectance using two reflecting plates, according to a second embodiment of the present invention.
Figure 3:
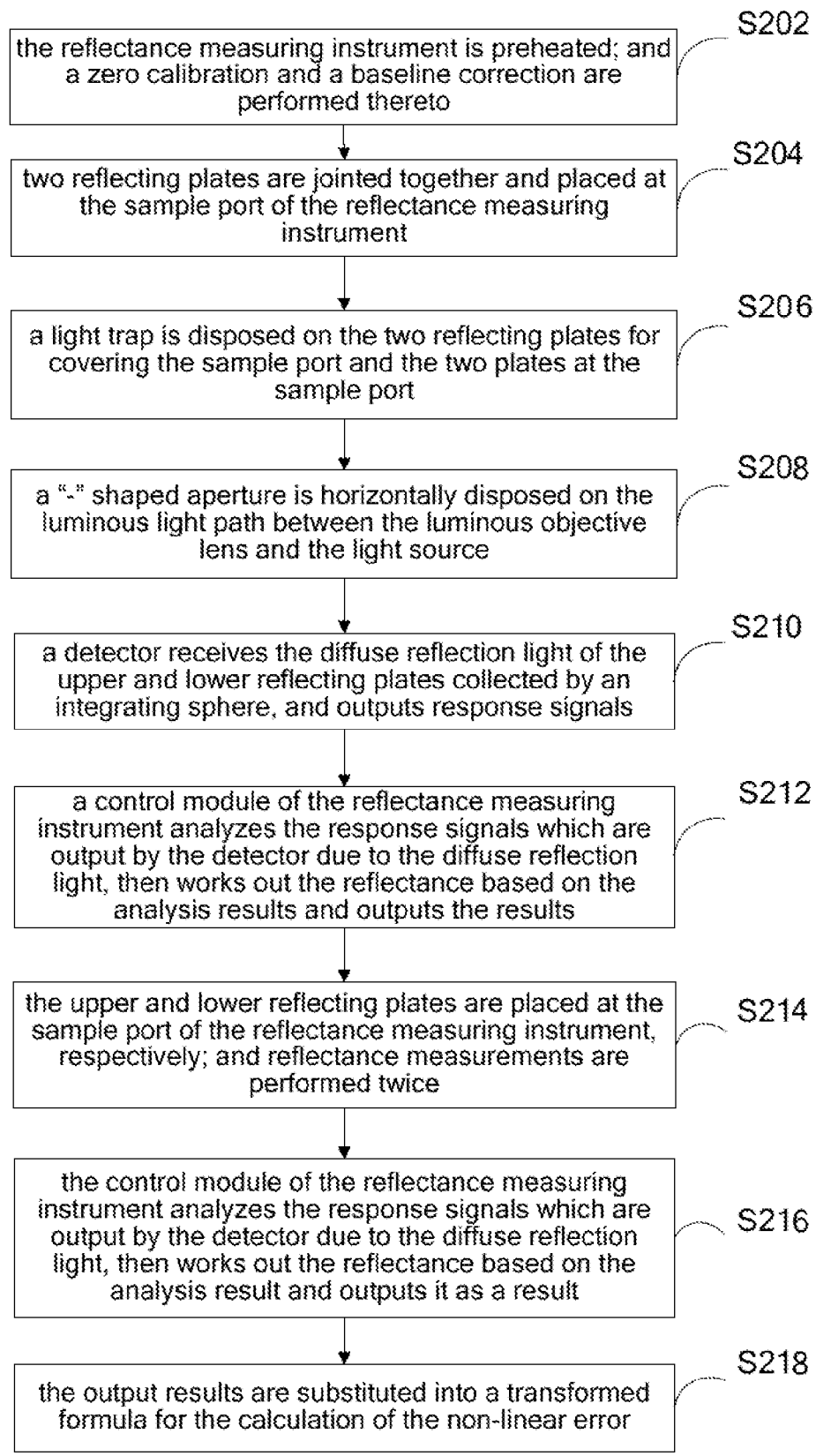
FIG. 3 illustrates a flow chart showing steps of measuring the non-linear error of a reflectance of the reflectance measuring instrument by using the apparatus as illustrated in FIG. 2.

FIG. 2 is a view showing an apparatus according to this embodiment in which reflectance measuring instrument under 0:d condition measures the non-linear error of the reflectance using two reflecting plates; FIG. 3 is a flow chart showing steps of measuring the non-linear error of a reflectance result of the reflectance measuring instrument by using the apparatus as illustrated in FIG. 2.

As illustrated in FIG. 2, the apparatus, in which reflectance measuring instrument under 0:d condition measures non-linear error using two reflecting plates, mainly includes light paths 76, upper reflecting plate 7, lower reflecting plate 8 and aperture 2. The non-linear error measurement in this embodiment may further employ control module 62 of the reflectance measuring instrument. Light paths 76 may mainly include light source 1 consisting of halogen lamp 14 and monochrometer 15, luminous objective lens 3, integrating sphere 5 and detector 10. The lights emitted from light source 1 may enter integrating sphere 5 after passing through luminous objective lens 3, and then converges on upper reflecting plate 7 and lower reflecting plate 8 to form light paths 76. "–" shaped aperture 2 may be placed in the luminous light paths. Detector 10 is capable of receiving the light entering integrating sphere 5. The output results of the reflectance measuring instrument under 0:d condition are the reflectances corresponding to the respective wavelengths.

Detailed steps of measuring the non-linear error of the reflectances of the reflectance measuring instrument by using the apparatus as illustrated in FIG. 2 are as follows:

Step S202, the reflectance measuring instrument is preheated; and a zero calibration and a baseline correction are performed thereto.

The zero calibration and baseline correction to the reflectance measuring instrument may be completed by those skilled in the art with reference to related implementation approaches, and thus the detailed description thereof will be omitted herein.

Step S204, two reflecting plates are jointed together and placed at the sample port of the reflectance measuring instrument.

Upper and lower reflecting plates 7 and 8 respectively has the same reflectance factor, and the same covering area at sample port 6, and each plate has a respective specified position at sample port 6. Upper reflecting plate 7 is placed at the upper portion of sample port 6, and lower reflecting plate 8 is placed at the lower portion of sample port 6.

Step S206, light trap 9 is disposed on the two reflecting plates for covering sample port 6 and the two plates at sample port 6.

Step S208, "–" shaped aperture 2 is horizontally disposed on the luminous light path between the luminous objective lens and the light source.

Figure 4:
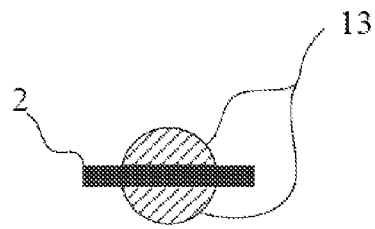
FIG. 4 is a schematic view showing the position where a "−" shaped aperture in the apparatus as illustrated in FIG. 2 is located.
Figure 5:
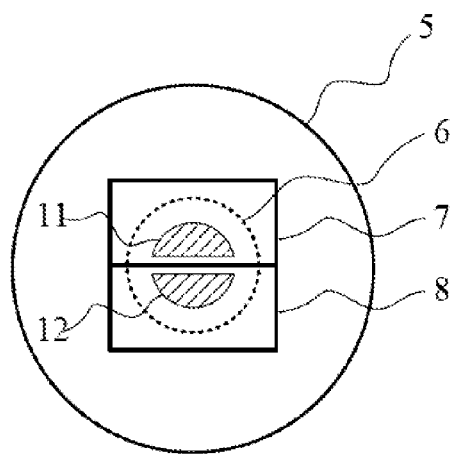
FIG. 5 is a schematic view showing the lighting regions of two reflecting plates in the apparatus as illustrated in FIG. 2.

Above "–" shaped aperture 2 is disposed as illustrated as FIG. 4. "–" shaped aperture 2 is capable of dividing cross section 13 of the luminous light path into upper and lower portions. FIG. 5 illustrates the lighting regions of the two respective reflecting plates. The lights emitted from light source 1 may pass the blockage of "–" shaped aperture 2, and then converges on upper reflecting plate 7 and lower reflecting plate 8 through the luminous objective lens, so that the luminous light path may form upper lighting region 11 and lower lighting region 12 at sample port 6. Upper and lower lighting regions 11 and 12 have the same illumination intensity and do not cover edges of upper reflecting plate 7 and lower reflecting plate 8, whereby avoiding the influence on the measurement result of the non-linear error due to the dispersion of light at the edges.

Step S210, a detector receives the diffuse reflectance light of upper and lower reflecting plates 7 and 8 collected by integrating sphere 3, and outputs response signals.

Step S212, a control module of the reflectance measuring instrument analyzes the response signals which are output by the detector due to the diffuse reflectance light, then works out the reflectances based on the analysis results and outputs the results. The output results of the reflectances may be indicated by $R_{all}(\lambda)$, wherein $\lambda$ represents a wavelength.

Figure 6:
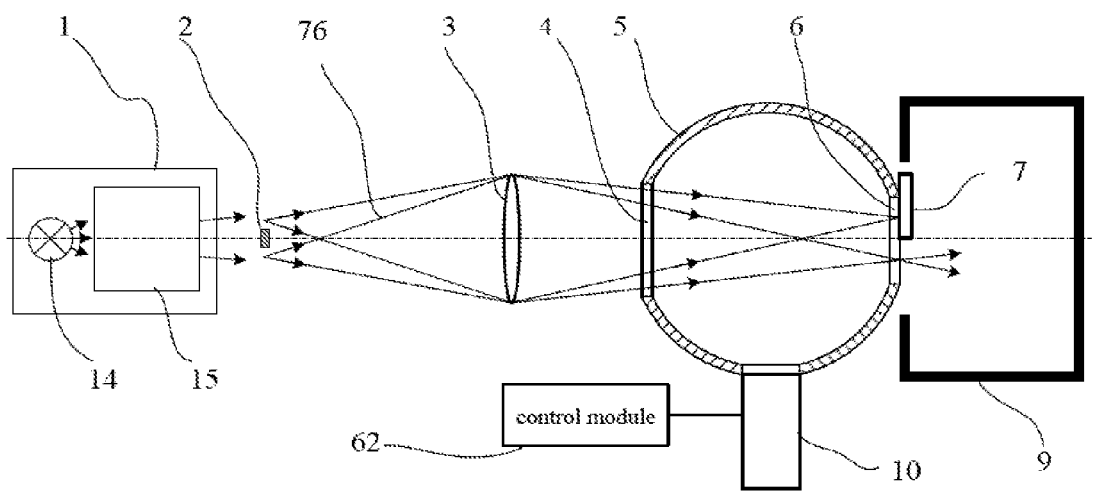
FIG. 6 is a schematic view showing the light paths of the two reflecting plates in the apparatus as illustrated in FIG. 2 during the non-linear error measurement.

Step S214, upper and lower reflecting plates 7 and 8 are placed at the sample port of the reflectance measuring instrument, respectively; and reflectance measurements are performed twice. This step further includes:

a) As illustrated in FIG. 6, upper and lower reflecting plates 7 and 8 are placed at the sample port of the reflectance measuring instrument, respectively. When upper reflecting plate 7 is placed at sample port 6 of the reflectance measuring instrument, it is placed at the upper portion of sample port 6; and the lower portion of sample port 6 is hollowed-out; in such a manner that the light may irradiate light trap 9 through sample port 6 and be absorbed by light trap 9. At this time, the reflectance of the upper portion of sample port 6 is the same as that of upper reflecting plate 7, and the reflectance of the lower portion of sample port 6 is zero.

b) When lower reflecting plate 8 is placed at sample port 6 of the reflectance measuring instrument, it is placed at the lower portion of the sample port 6; and the upper portion of sample port 6 is hollowed-out; in such a manner that the light may irradiate light trap 9 through sample port 6 and be absorbed by light trap 9. At this time, the reflectance of the upper portion of sample port 6 is zero, and the reflectance of the lower portion of sample port 6 is the same as that of lower reflecting plate 8.

Step S216, the control module of the reflectance measuring instrument analyzes the response signals which are output by the detector due to the diffuse reflectance light, then works out the reflectance value based on the analysis result and outputs it as a result. The output results of the reflectances may be indicated by $R_1(\lambda)$ and $R_2(\lambda)$.

Step S218, the output results $R_{all}(\lambda)$, $R_1(\lambda)$ and $R_2(\lambda)$ are substituted into a transformed formula (1) for the calculation of the non-linear error.

$$L_{nonlinear}(\lambda) = \frac{R_{all}(\lambda) - \sum_{i=1\sim M} R_i(\lambda)}{\sum_{i=1\sim M} R_i(\lambda)} \quad \text{Formula (1)}$$

The non-linear error calculation formula (1) as used in this embodiment is derived from a non-linear error calculation formula (2).

$$L_{nonlinear} = \frac{\rho_{all} - \sum_{i=1\sim M} \rho_i}{\sum_{i=1\sim M} \rho_i} \quad \text{Formula (2)}$$

When the optical measuring instrument has an ability of spectral measurement, the output results thereof will meet a formula (3); wherein λ represents a wavelength; and accordingly, $R_{all}(\lambda)$, $R_1(\lambda)$, $R_2(\lambda)$ . . . $R_M(\lambda)$ represents the reflectance, the diffuse reflectance and the reflectance factor when the wavelength is λ.

$$\begin{cases} \rho_{all} = R_{all}(\lambda) \\ \rho_1 = R_1(\lambda) \\ \rho_2 = R_2(\lambda) \\ \ldots \\ \rho_M = R_M(\lambda) \end{cases} \quad \text{Formula (3)}$$

Formula (3) is substituted into formula (2), and the transformed non-linear error calculation formula (1)

$$L_{nonlinear}(\lambda) = \frac{R_{all}(\lambda) - \sum_{i=1\sim M} R_i(\lambda)}{\sum_{i=1\sim M} R_i(\lambda)}$$

is then derived.

In above formulas, $\rho_1 \sim \rho_M$, as indicated in formula (2), refer to results output by the optical measuring instrument measuring the 1st through the Mth groups of measured pieces, respectively; $\rho_{all}$ refers to a result output by the optical measuring instrument measuring M groups of measured pieces at the same time; $L_{nonlinear}$ refers to the non-linear error of the output results at a 1/M position of the measuring range of the optical measuring instrument; ρ refers to output results; and i is a natural number. $L_{nonlinear}(\lambda)$, as indicated in formula (1), refers to the non-linear error of the reflectance value output by the reflectance measuring instrument. In this embodiment, the transformed non-linear error calculation formula (1) is applicable to the calculation of the non-linear error of other output results (such as diffuse reflectance, reflectance factor, etc.) of the reflectance measuring instrument.

Following substituting the output results $R_{all}(\lambda)$, $R_1(\lambda)$ and $R_2(\lambda)$ into the transformed formula (1) for the calculation of the non-linear error, a non-linear error formula (4) of the output results of the reflectance measuring instrument according to this embodiment will be derived.

$$L_{nonlinear}(\lambda) = \frac{R_{all}(\lambda) - [R_1(\lambda) + R_2(\lambda)]}{R_1(\lambda) + R_2(\lambda)} \quad \text{Formula (4)}$$

In formula (4), $L_{nonlinear}(\lambda)$ refers to the non-linear error of the reflectance result of the reflectance measuring instrument at ½ of the measuring range from 0 to $R_{all}(\lambda)$; $R_{all}(\lambda)$ refers to the reflectance value output by the reflectance measuring instrument when the two reflecting plates are placed at the sample port at the same time; $R_1(\lambda)$ refers to the reflectance value output by the reflectance measuring instrument when the lower reflecting plate is placed at the sample port; and $R_2(\lambda)$ refers to the reflectance value output by the reflectance measuring instrument when the upper reflecting plate is placed at the sample port.

The absolute measurement method for the non-linear error according to this embodiment, by placing N reflecting plates in the measuring apparatus for the non-linear error, may accomplish an absolute measurement for the non-linear error of the output results of various optical measuring instruments such as a reflectance measuring instrument, a chromaticity measuring instrument and a whiteness meter and so on. In the absolute measurement of the this invention, the reflectance or the chromatic value or the whiteness value in different regions of the sample port of instrument can be directly changed by setting the number of the reflecting plates; and the non-linear error of the output results can be computed by using superposition principle through several measurements, instead of measuring the non-linear error by using the samples with known parameters; whereby avoiding the difficulty in improving the measurement precision of the non-linear error due to the indeterminacy of the nominal values of samples. This absolute measurement comprehensively considers the influence of the non-linear error which is introduced into the measurement results due to various factors such as light path, detector and integrating sphere. Therefore, it can accomplish the measurement for the non-linear error of the final output results of the reflectance measuring instrument while ensuring the accuracy of the non-linear error measurement.

It should be understood that the absolute measurement method for the non-linear error of the reflectance measuring instrument under 0:d condition above is described for the purpose of illustration. It will be obvious to those skilled in the art, a measurement for a non-linear error of output results would be made to a reflectance measuring instrument under other condition by employing the measurement method of this embodiment.

Third Embodiment

Figure 7:
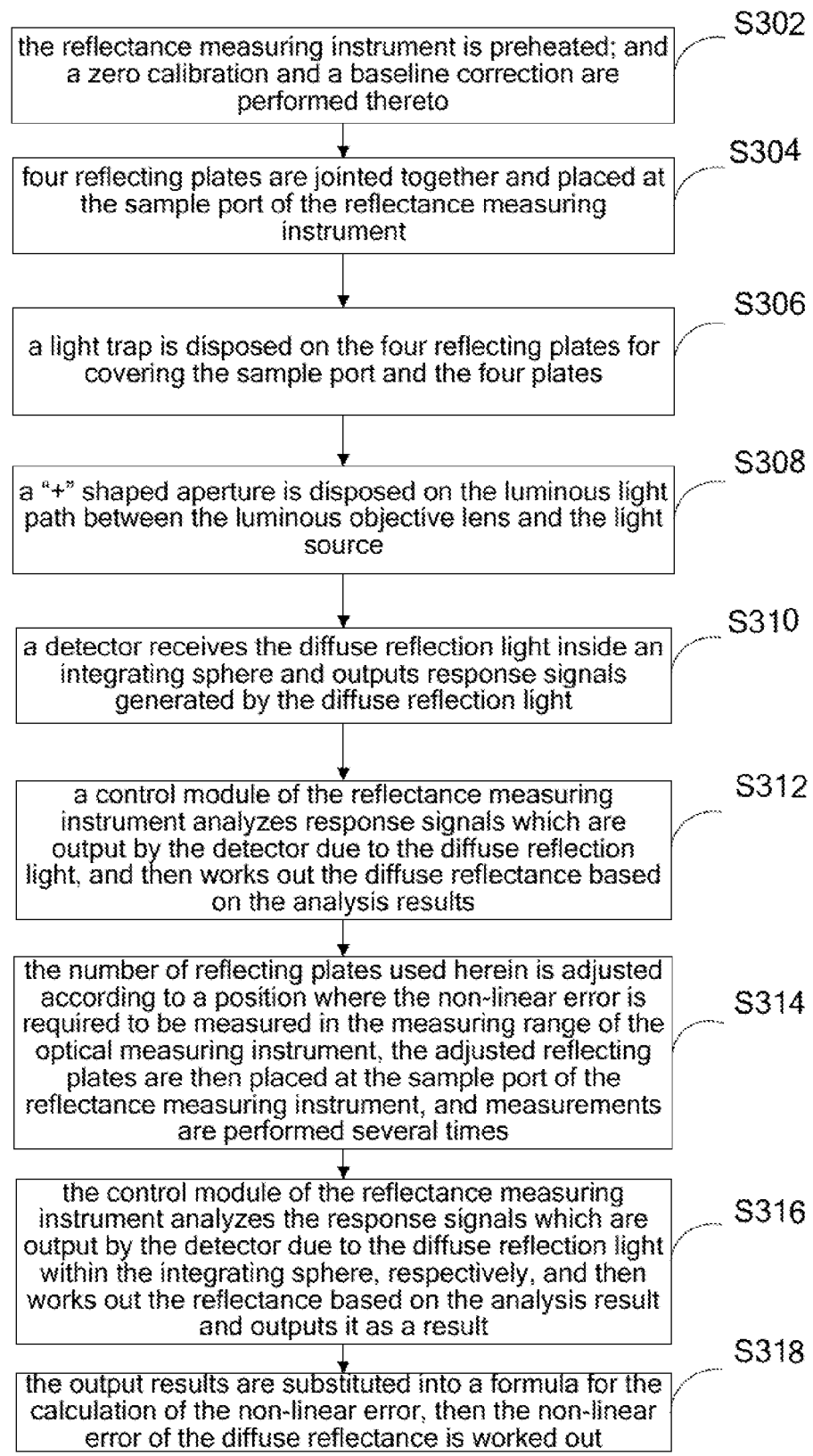
FIG. 7 illustrates a flow chart showing steps of an absolute measurement method for non-linear error, using the apparatus as illustrated in FIG. 2 and utilizing four reflecting plates to measure a diffuse reflectance of the reflectance measuring instrument, according to a third embodiment of the present invention.

FIG. 7 illustrates a flow chart showing steps of measuring a non-linear error of a diffuse reflectance of a reflectance measuring instrument, using the apparatus as illustrated in FIG. 2 according to the embodiment of the present invention; wherein the two reflecting plates of FIG. 2 are replaced with four reflecting plates and the "–" shaped aperture is replaced with a "+" shaped aperture.

The absolute measurement for the non-linear error of the diffuse reflectance of the reflectance measuring instrument using above apparatus may comprise the following detailed steps:

Step S302, the reflectance measuring instrument is preheated; and a zero calibration and a baseline correction are performed thereto.

Step S304, four reflecting plates are jointed together and placed at the sample port of the reflectance measuring instrument.

Figure 8:
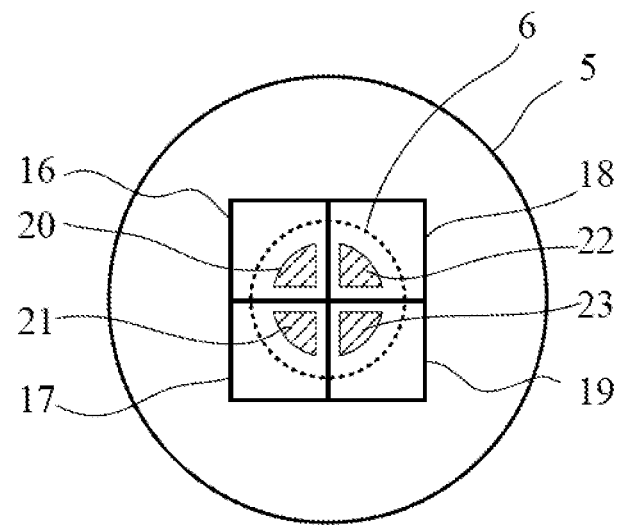
FIG. 8 is a schematic view showing the lighting regions of four reflecting plates in the apparatus as illustrated in FIG. 2, according to the third embodiment of the present invention.

The four reflecting plates according to this embodiment are disposed as shown in FIG. 8. The four reflecting plates includes first reflecting plate 16, second reflecting plate 17, third reflecting plate 18 and fourth reflecting plate 19, respectively; and are placed together at sample port 6 of the reflectance measuring instrument. Each reflecting plate has a same covering area at sample port 6 and a respective specified position to be arranged. In particular, first reflecting plate 16 is placed at upper left portion of sample port 6; second reflecting plate 17 is placed at lower left portion of sample port 6; third reflecting plate 18 is placed at upper right portion of sample port 6; and fourth reflecting plate 19 is placed at lower right portion of sample port 6. Each reflecting plate has a same diffuse reflectance.

Step S306, light trap 9 is disposed on the four reflecting plates for covering the sample port and the four plates.

Step S308, "+" shaped aperture 24 is disposed on the luminous light path between the luminous objective lens and the light source.

Figure 9:
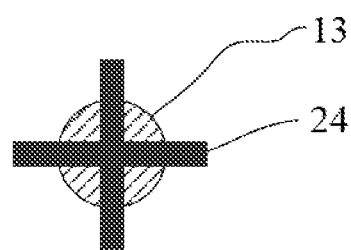
FIG. 9 is a schematic view showing the position where a "+" shaped aperture in the apparatus as illustrated in FIG. 2 is located, according to the third embodiment of the present invention.

"+" shaped aperture 24 according to this embodiment is arranged as shown in FIG. 9. "+" shaped aperture 24 is capable of evenly dividing the cross section of the luminous light path into four portions. As illustrated in FIG. 8, the luminous light path at sample port 6 forms first lighting region 20, second lighting region 21, third lighting region 22 and fourth lighting region 23. The four lighting regions have the same illumination intensity and do not cover edges of first reflecting plate 16, second reflecting plate 17, third reflecting plate 18 and fourth reflecting plate 19; whereby avoiding the influence on the measurement result of the non-linear error of the diffuse reflectance due to the dispersion of light at the edges of the reflecting plates.

Step S310, a detector receives the diffuse reflectance light inside an integrating sphere and outputs response signals generated by the diffuse reflectance light.

Step S312, a control module of the reflectance measuring instrument analyzes response signals which are output by the detector due to the diffuse reflectance light, and then works out the diffuse reflectances based on the analysis results.

The output results of the diffuse reflectances may be indicated by $R_{all}(\lambda)$, wherein $\lambda$ represents a wavelength.

Step S314, the number of reflecting plates used herein is adjusted according to a measuring range of the reflectance measuring instrument, the adjusted reflecting plates are then placed at the sample port of the reflectance measuring instrument, and measurements are performed several times.

When measuring the non-linear error of the diffuse reflectance at ½ position of measuring range of the reflectance measuring instrument, the four reflecting plates are divided into two groups, wherein first reflecting plate 16 and second reflecting plate 17 are formed as the first group; and third reflecting plate 18 and fourth reflecting plate 19 are formed as the second group. The first and second groups of the reflecting plates are placed at sample port 6 of the reflectance measuring instrument, respectively; and in such a manner, measurements are performed twice.

When the placement of the first group of the reflecting plates, first reflecting plate 16 is arranged at the upper left portion of sample port 6, and second reflecting plate 17 is arranged at lower left portion of sample port 6. At this time, the right side of the sample port is hollowed out. When the placement of the second group of the reflecting plates, third reflecting plate 18 is arranged at upper right portion of sample port 6, and fourth reflecting plate 19 is arranged at lower right portion of sample port 6. At this time, the left side of the sample port is hollowed out.

When measuring the non-linear error of the diffuse reflectance at ¼ position of measuring range of the reflectance measuring instrument, the four reflecting plates are divided into four groups. The first through fourth groups of the reflecting plates are placed at sample port 6 of the reflectance measuring instrument, respectively; and in such a manner, measurements are performed four times.

In this manner, first reflecting plate 16 is formed as the first group, second reflecting plate 17 is formed as the second group, third reflecting plate 18 is formed as the third group and fourth reflecting plate 19 is formed as the fourth group. Respective groups of the reflecting plates are placed sequentially, in such a manner that when first reflecting plate 16 is arranged at the upper left portion of sample port 6, the remainder of the sample port is hollowed out; when second reflecting plate 17 is arranged at lower left portion of sample port 6, the remainder of the sample port is hollowed out; when third reflecting plate 18 is arranged at upper right portion of sample port 6, the remainder of the sample port is hollowed out; and fourth reflecting plate 19 is arranged at lower right portion of sample port 6, the remainder of the sample port is hollowed out. Measurements are performed four times in the four arrangements, respectively.

Step S316, the control module of the reflectance measuring instrument analyzes the response signals which are output by the detector due to the diffuse reflectance light within the integrating sphere, respectively; then works out the reflectance value based on the analysis result and outputs it as a result.

When measuring the non-linear error of the diffuse reflectance at ½ position of measuring range of the reflectance measuring instrument, the output results may be indicated by $R_1(\lambda)$ and $R_2(\lambda)$, respectively; when measuring the non-linear error of the diffuse reflectance at ¼ position of measuring range of the reflectance measuring instrument, the output results may be indicated by $R_1(\lambda)$, $R_2(\lambda)$, $R_3(\lambda)$ and $R_4(\lambda)$, respectively.

Step S318, the output results are substituted into a formula for the calculation of the non-linear error, then the non-linear error of the diffuse reflectance is worked out.

When measuring non-linear error of the diffuse reflectance at ½ position of measuring range of the reflectance measuring instrument, the output results $R_{all}(\lambda)$, $R_1(\lambda)$ and $R_2(\lambda)$ are substituted into the transformed non-linear error calculation formula (1), a non-linear error calculation formula (5) is derived for the output results.

$$L_{nonlinear}(\lambda) = \frac{R_{all}(\lambda) - [R_1(\lambda) + R_2(\lambda)]}{R_1(\lambda) + R_2(\lambda)} \quad \text{Formula (5)}$$

In formula (5), $L_{nonlinear}(\lambda)$ refers to the non-linear error of the diffuse reflectance of the reflectance measuring instrument at ½ position of the measuring range; $R_{all}(\lambda)$, $R_1(\lambda)$ and $R_2(\lambda)$ refer to the diffuse reflectance output by the reflectance measuring instrument having a wavelength of $\lambda$, and $\lambda$ refers to wavelength.

When measuring the non-linear error of the diffuse reflectance at ¼ position of measuring range of the reflectance measuring instrument, the output results $R_{all}(\lambda)$, $R_1(\lambda)$, $R_2(\lambda)$, $R_3(\lambda)$ and $R_4(\lambda)$ are substituted into the transformed non-linear error calculation formula (1), a non-linear error calculation formula (6) is derived for the output results.

$$L_{nonlinear}(\lambda) = \frac{R_{all}(\lambda) - \sum_{i=1\sim4} R_i(\lambda)}{\sum_{i=1\sim4} R_i(\lambda)} \quad \text{Formula (6)}$$

In formula (6), $L_{nonlinear}(\lambda)$ refers to the non-linear error of the diffuse reflectance of the reflectance measuring instrument at ¼ position of the measuring range; $R_{all}(\lambda)$ refers to the diffuse reflectance output by the reflectance measuring instrument having a wavelength of $\lambda$; i refers to the times of measuring the placed reflecting plates, and $\lambda$ refers to wavelength.

The absolute measurement method for the non-linear error according to this embodiment, by placing N reflecting plates in the measuring apparatus for the non-linear error, may accomplish an absolute measurement for the non-linear error of the output results of various optical measuring instruments such as a reflectance measuring instrument, a chromaticity measuring instrument and a whiteness meter and so on. In the absolute measurement of the this embodiment, the reflectance or the chromatic value or the whiteness value in different regions of the sample port of instrument can be directly changed by setting the number of the reflecting plates; and the non-linear error of the output results can be computed by using superposition principle through several measurements, instead of measuring the non-linear error by using the samples with known parameters; whereby avoiding the difficulty in improving the measurement precision of the non-linear error due to the indeterminacy of the nominal values of samples. This absolute measurement comprehensively considers the influence of the non-linear error which is introduced into the measurement results due to various factors such as light path, detector and integrating sphere. Therefore, it can accomplish the measurement for the non-linear error of the final output results of the reflectance measuring instrument while ensuring the accuracy of the non-linear error measurement.

Fourth Embodiment

Figure 10:
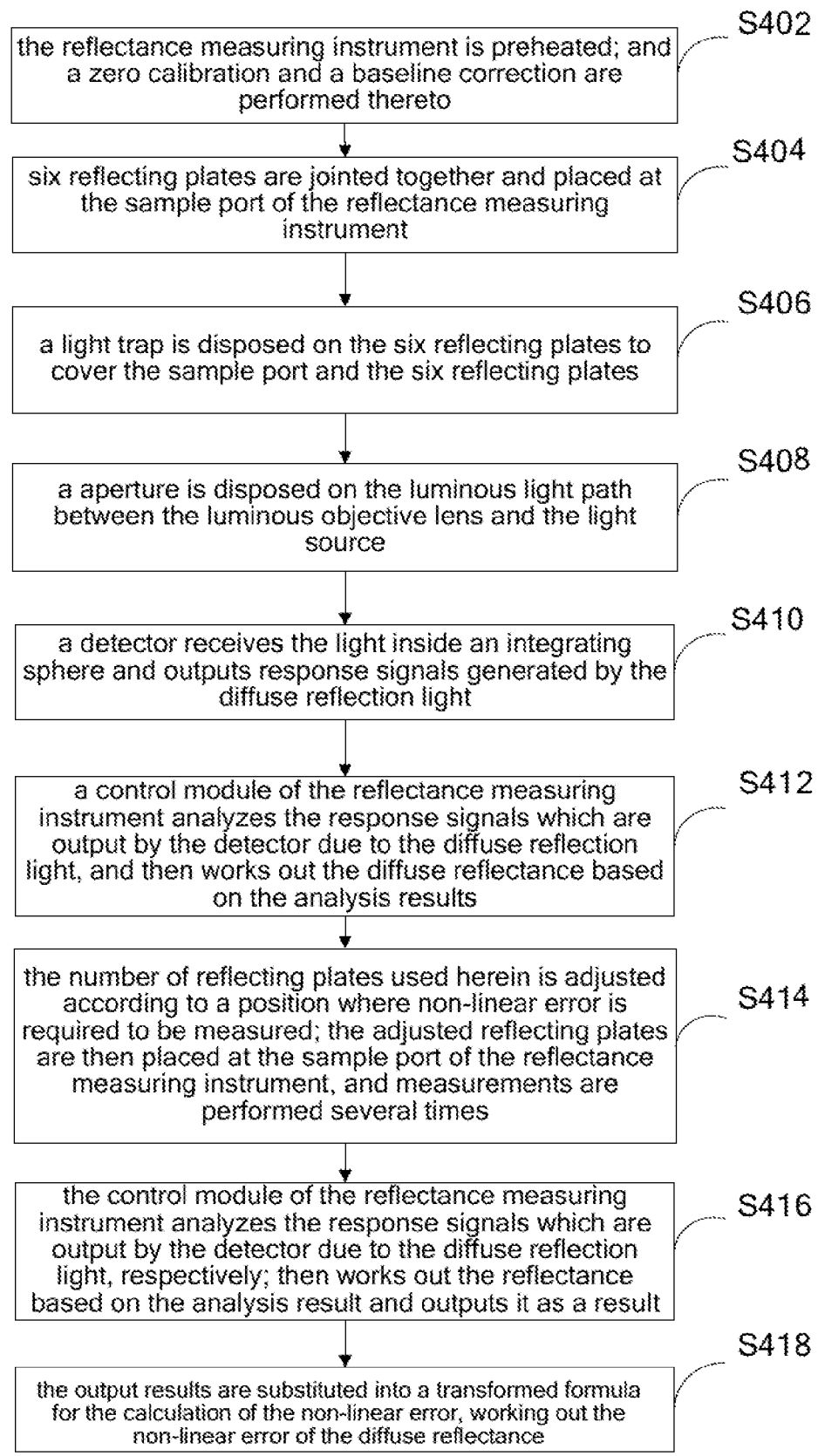
FIG. 10 illustrates a flow chart showing steps of an absolute measurement method for non-linear error, using the apparatus as illustrated in FIG. 2 and utilizing six reflecting plates to measure a diffuse reflectance of the reflectance measuring instrument, according to a fourth embodiment of the present invention.

FIG. 10 illustrates a flow chart showing steps of measuring a non-linear error of a diffuse reflectance of a reflectance measuring instrument, using the apparatus as illustrated in FIG. 2 according to the embodiment of the present invention; wherein the two reflecting plates of FIG. 2 are replaced with six reflecting plates and the "–" shaped aperture is replaced with a "*" shaped aperture as illustrated in FIG. 11.

The reflectance measuring instrument has a capacity of outputting the reflectance, the diffuse reflectance or the reflectance factor. In this embodiment, the absolute measurement for the non-linear error of the diffuse reflectance output by the reflectance measuring instrument under 0:d condition could be achieved by using six reflecting plates. The detailed steps of this method are as follows:

Step S402, the reflectance measuring instrument is preheated; and a zero calibration and a baseline correction are performed thereto.

Step S404, six reflecting plates are jointed together and placed at the sample port of the reflectance measuring instrument.

As illustrated in FIG. 12, the six reflecting plates are placed at sample port 6 of the reflectance measuring instrument at the same time. The six reflecting plates includes first reflecting plate 63, second reflecting plate 64, third reflecting plate 65, fourth reflecting plate 66, fifth reflecting plate 67 and sixth reflecting plate 68, respectively. Each of reflecting plate has a respective specified position to be arranged at the sample port. The six reflection plates are arranged counterclockwise and have same covering areas at the sample port. In addition, each reflecting plate has a same diffuse reflectance.

step 406, light trap 9 is disposed on the six reflecting plates to cover the sample port and the six reflecting plates.

As illustrated in FIG. 2, light trap 9 is capable of covering the sample port and the six reflecting plates disposed at the sample port.

Step S408, an aperture is disposed on the luminous light path between the luminous objective lens and the light source.

"*" shaped aperture 75 according to this embodiment is arranged as illustrated in FIG. 11. The "*" shaped aperture 75 is capable of evenly dividing the cross section 13 of the luminous light path into six portions.

The lighting regions of the six reflecting plates according to this embodiment are illustrated in FIG. 12. The luminous light path at sample port 6 forms first lighting region 69, second lighting region 70, third lighting region 71, fourth lighting region 72, fifth lighting region 73 and sixth lighting region 74. The six lighting regions have the same illumination intensity and do not cover edges of first reflecting plate 63, second reflecting plate 64, third reflecting plate 65, fourth reflecting plate 66, fifth reflecting plate 67 and sixth reflecting plate 68, whereby avoiding the influence on the measurement result of the non-linear error of the diffuse reflectance due to the dispersion of light at the edges of the reflecting plates.

Step S410, a detector receives the light inside an integrating sphere and outputs response signals generated by the diffuse reflectance light.

Step S412, a control module of the reflectance measuring instrument analyzes the response signals which are output by the detector due to the diffuse reflectance light, and then works out the diffuse reflectances based on the analysis results.

The output results of the diffuse reflectances may be indicated by $R_{all}(\lambda)$, wherein $\lambda$ represents a wavelength.

Step S414, the number of reflecting plates used herein is adjusted according to a position in the measuring range of the reflectance measuring instrument where non-linear error is required to be measured; the adjusted reflecting plates are then placed at the sample port of the reflectance measuring instrument, and measurements are performed several times.

When measuring the non-linear error of the diffuse reflectance at ½ position of measuring range of reflectance measuring instrument, the six reflecting plates are divided into two groups; wherein first reflecting plate 63, third reflecting plate 65 and fifth reflecting plate 67 are formed as the first group; and second reflecting plate 64, fourth reflecting plate 66 and sixth reflecting plate 68 are formed as the second group. The first and second groups of the reflecting plates are placed at sample port 6 of the reflectance measuring instrument, respectively; and in such a manner, measurements are performed twice. The first and second groups of the reflecting plates are placed at sample port 6, so that the reflecting plates of each group are arranged back at the positions where these reflecting plates at step S404 are placed, respectively; while the remaining positions where reflecting plates are not placed are hollowed out. In this manner, measurements are performed twice, respectively.

When measuring the non-linear error of the diffuse reflectance at ⅓ position of measuring range of the reflectance measuring instrument, the six reflecting plates are divided into three groups. The first through third groups of the reflecting plates are placed at the sample port, respectively; and in such a manner, measurements are performed three times. In this embodiment, first reflecting plate 63 and fourth reflecting plate 66 are formed as the first group; second reflecting plate 64 and fifth reflecting plate 67 are formed as the second group; and third reflecting plate 65 and sixth reflecting plate 68 are formed as the third group. When the respective placement of each group of the reflecting plates, the placed reflecting plates in each group are arranged back at the positions where these reflecting plates at step S404 are placed, respectively; while the remaining positions where reflecting plates are not placed are hollowed out. Measurements are performed three times in the three arrangements, respectively.

When measuring the non-linear error of the diffuse reflectance at ⅙ position of measuring range of the reflectance measuring instrument, the six reflecting plates are divided into six groups. The first through sixth groups of the reflecting plates are placed at the sample port, respectively; and in such a manner, measurements are performed six times. Accordingly, each of groups has one reflecting plate. When the respective placement of each group of the reflecting plate, the placed reflecting plate in each group is arranged back at the positions where these reflecting plates at step S404 are placed, respectively; while the remaining positions where reflecting plates are not placed are hollowed out. Measurements are performed six times in the six arrangements, respectively.

At step S416, the control module of the reflectance measuring instrument analyzes the response signals which are output by the detector due to the diffuse reflectance light, respectively; then works out the reflectance value based on the analysis result and outputs it as a result.

When measuring the non-linear error of the diffuse reflectance at ½ position of measuring range of the reflectance measuring instrument, the output results may be indicated by $R_1(\lambda)$ and $R_2(\lambda)$, respectively.

When measuring the non-linear error of the diffuse reflectance at ⅓ position of measuring range of the reflectance measuring instrument, the output results may be indicated by $R_1(\lambda)$, $R_2(\lambda)$ and $R_3(\lambda)$, respectively.

When measuring the non-linear error of the diffuse reflectance at ⅙ position of measuring range of the reflectance measuring instrument, the output results may be indicated by $R_1(\lambda)$, $R_2(\lambda)$, $R_3(\lambda)$, $R_4(\lambda)$, $R_5(\lambda)$ and $R_6(\lambda)$, respectively.

Step S418, the output results are substituted into a transformed formula for the calculation of the non-linear error, working out the non-linear error of the diffuse reflectance.

When measuring the non-linear error of the diffuse reflectance at ½ position of measuring range of the reflectance measuring instrument, the output results $R_{all}(\lambda)$, $R_1(\lambda)$ and $R_2(\lambda)$ are substituted into the transformed non-linear error calculation formula (1), a non-linear error calculation formula (7) is derived for the output results.

$$L_{nonlinear}(\lambda) = \frac{R_{all}(\lambda) - [R_1(\lambda) + R_2(\lambda)]}{R_1(\lambda) + R_2(\lambda)} \quad \text{Formula (7)}$$

In formula (7), $L_{nonlinear}(\lambda)$ refers to the non-linear error of the diffuse reflectance of the reflectance measuring instrument at ½ position of the measuring range; $R_{all}(\lambda)$ refers to the diffuse reflectance output by the reflectance measuring instrument when the two groups of the reflecting plates are placed at the sample port at the same time; $R_1(\lambda)$ refers to the diffuse reflectance output by the reflectance measuring instrument when the first group of the reflecting plates is placed at the sample port; and $R_2(\lambda)$ refers to the diffuse reflectance output by the reflectance measuring instrument when the second group of the reflecting plates is placed at the sample port.

When measuring the non-linear error of the diffuse reflectance at ⅓ position of measuring range of the reflectance measuring instrument, the output results $R_{all}(\lambda)$, $R_1(\lambda)$, $R_2(\lambda)$ and $R_3(\lambda)$ are substituted into the transformed non-linear error calculation formula (1), a non-linear error calculation formula (8) is derived for the output results.

$$L_{nonlinear}(\lambda) = \frac{R_{all}(\lambda) - \sum_{i=1\sim 3} R_i(\lambda)}{\sum_{i=1\sim 3} R_i(\lambda)} \quad \text{Formula (8)}$$

In formula (8), $L_{nonlinear}(\lambda)$ refers to the non-linear error of the diffuse reflectance of the reflectance measuring instrument at ⅓ position of the measuring range; $R_{all}(\lambda)$ refers to the diffuse reflectance output by the reflectance measuring instrument when the three groups of the reflecting plates are placed at the sample port at the same time; and $R_i(\lambda)$ refers to the diffuse reflectance output by the reflectance measuring instrument when each group of the reflecting plates is placed at the sample port, respectively; wherein i refers to the times of measuring the placed reflecting plates.

When measuring the non-linear error of the diffuse reflectance at ⅙ position of measuring range of the reflectance measuring instrument, the output results $R_{all}(\lambda)$, $R_1(\lambda)$, $R_2(\lambda)$, $R_3(\lambda)$, $R_4(\lambda)$, $R_5(\lambda)$ and $R_6(\lambda)$ are substituted into the transformed non-linear error calculation formula (1), a non-linear error calculation formula (9) is derived for the output results.

$$L_{nonlinear}(\lambda) = \frac{R_{all}(\lambda) - \sum_{i=1\sim 6} R_i(\lambda)}{\sum_{i=1\sim 6} R_i(\lambda)} \quad \text{Formula (9)}$$

In formula (9), $L_{nonlinear}(\lambda)$ refers to the non-linear error of the diffuse reflectance of the reflectance measuring instrument at ⅙ position of the measuring range; $R_{all}(\lambda)$ refers to the diffuse reflectance output by the reflectance measuring instrument when the six groups of the reflecting plate are placed at the sample port at the same time; and $R_i(\lambda)$ refers to the diffuse reflectance output by the reflectance measuring instrument when each group of the reflecting plate is placed at the sample port, respectively; wherein i refers to the times of measuring the placed reflecting plates.

The absolute measurement method for the non-linear error according to this embodiment, by placing N reflecting plates in the measuring apparatus for the non-linear error, may accomplish an absolute measurement for the non-linear error of the output results of various optical measuring instruments such as a reflectance measuring instrument, a chromaticity measuring instrument and a whiteness meter and so on. In the absolute measurement of the this embodiment, the reflectance or the chromatic value or the whiteness value in different regions of the sample port of instrument can be directly changed by setting the number of the reflecting plates; and the non-linear error of the output results can be computed by using superposition principle through several measurements, instead of measuring the non-linear error by using the samples with known parameters; whereby avoiding the difficulty in improving the measurement precision of the non-linear error due to the indeterminacy of the nominal values of samples. This absolute measurement comprehensively considers the influence of the non-linear error which is introduced into the measurement results due to various factors such as light path, detector and integrating sphere. Therefore, it can accomplish the measurement for the non-linear error of the final output results of the reflectance measuring instrument while ensuring the accuracy of the non-linear error measurement.

It should be understood, the aperture herein is mainly used to equally divide the cross section of the light path into several portions corresponding to the number of the reflecting plates. In this embodiment, "*" shaped aperture is illustrated to equally divide the cross section of the luminous light path into six portions, but it is not limited thereto, and any other suitable shapes may also be applicable to this embodiment as long as they could equally divide the luminous light path into six portions. For example, when a measuring instrument is provided with two reflecting plates, a "–" shaped aperture could be selected to evenly divide the cross section of the luminous light path into two portions; when a measuring instrument is provided with four reflecting plates, a "+" shaped aperture could be selected to evenly divide the cross section of the luminous light path into four portions; when a measuring instrument is needed to be provided with more than four reflecting plates, an appropriate aperture could be selected as required.

Fifth Embodiment

Figure 14:
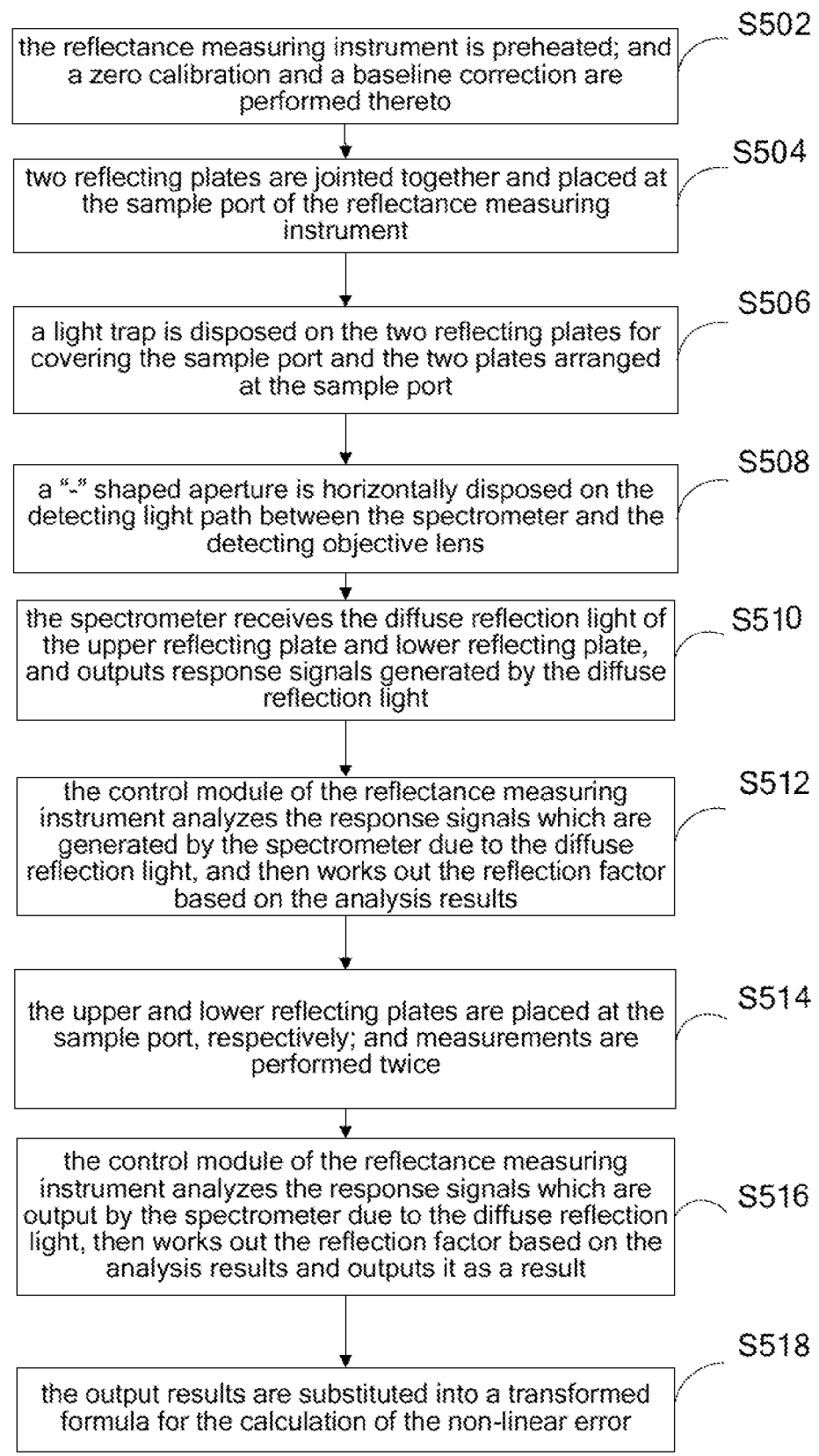
FIG. 14 illustrates a flow chart showing steps of measuring the non-linear error of reflectance factors of the reflectance measuring instrument by using the apparatus as illustrated in FIG. 13.

The measurement method for the non-linear error according to this embodiment will be explained in conjunction with FIGS. 13 and 14.

FIG. 13 illustrates an apparatus in which the reflectance measuring instrument under 0:d condition measures non-linear error of reflectance factors using two reflecting plates, according to this embodiment; FIG. 14 illustrates a flow chart showing steps of measuring the non-linear error of reflectance factors of the reflectance measuring instrument by using the apparatus as illustrated in FIG. 13.

As illustrated in FIG. 13, the absolute measurement apparatus for the non-linear error may mainly include light paths 77, upper reflecting plate 29, lower reflecting plate 30 and aperture 34. The non-linear error measurement in this embodiment may further employ control module 62 of the reflectance measuring instrument. The light paths may substantially include xenon lamp 32, integrating sphere 27, detecting objective lens 25 and spectrometer 33. The light emitted from xenon lamp 32, after passing through integrating sphere 27, may disperse onto upper and lower reflecting plates 29 and 30. The diffuse reflecting light generated by upper and lower reflecting plates 29 and 30, after passing through detecting objective lens 25 and "–" shaped aperture 34, may enter spectrometer 33 to form light paths 77. "–" shaped aperture 34 may be placed on a detecting part in the luminous light paths. The output results of the reflectance measuring instrument are the reflectance factors corresponding to respective wavelengths.

Detailed steps of measuring the reflectance error of the reflectance measuring instrument by using the apparatus as illustrated in FIG. 13 are as follows:

Step S502, the reflectance measuring instrument is preheated; and a zero calibration and a baseline correction are performed thereto.

Step S504, two reflecting plates are jointed together and placed at the sample port of the reflectance measuring instrument.

Upper and lower reflecting plates 29 and 30 respectively has the same reflectance factor, and the same covering area at sample port 28, and each plate has a respective specified position at the sample port; wherein upper reflecting plate 29 is placed at the upper portion of sample port 28, and lower reflecting plate 30 is placed at the lower portion of sample port 28.

Step S506, a light trap is disposed on the two reflecting plates for covering the sample port and the two plates arranged at the sample port.

Step S508, "–" shaped aperture 34 is horizontally disposed on the detecting light path between the spectrometer and the detecting objective lens.

Figure 15:
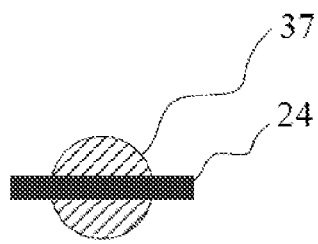
FIG. 15 is a schematic view showing the position where a "−" shaped aperture in the apparatus as illustrated in FIG. 13 is located, according to the fifth embodiment of the present invention.
Figure 16:
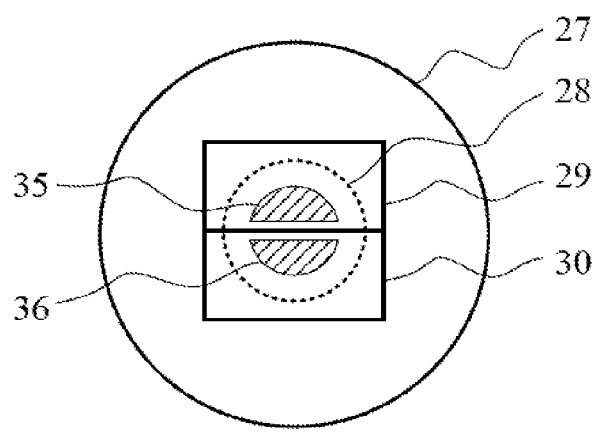
FIG. 16 is a schematic view showing the detecting regions of two reflecting plates in the apparatus as illustrated in FIG. 13, according to the fifth embodiment of the present invention.

In this embodiment, the above "–" shaped aperture 34 is arranged as illustrated in FIG. 15. "–" shaped aperture 34 is capable of dividing the cross section of the detecting light path into upper and lower portions. The detecting light path in this embodiment is illustrated in FIG. 16. Due to the blockage of "–" shaped aperture 34, the detecting light path is divided into two portions at the detecting region of sample port 28, wherein upper and lower detecting regions 35 and 36 have a same area and detecting sensitivity, and do not cover edges of upper and lower reflecting plates 29 and 30; whereby avoiding the influence on the measurement result of the non-linear error due to the dispersion of light at the edges.

Step S510, the spectrometer receives the diffuse reflectance light of the upper reflecting plate and lower reflecting plate, and outputs response signals generated by the diffuse reflectance light.

The light emitted from xenon lamp 32, after passing through integrating sphere 27, may disperse onto upper and lower reflecting plates 29 and 30. The diffuse reflecting light generated by upper and lower reflecting plates 29 and 30, after passing through detecting objective lens 25 and "–" shaped aperture 34, may enter spectrometer 33.

Step S512, the control module of the reflectance measuring instrument analyzes the response signals which are generated by the spectrometer due to the diffuse reflectance light, and then works out the reflectance factor based on the analysis results.

The output results of the reflectance factor may be indicated by $R_{all}(\lambda)$, wherein $\lambda$ represents a wavelength.

Figure 17:
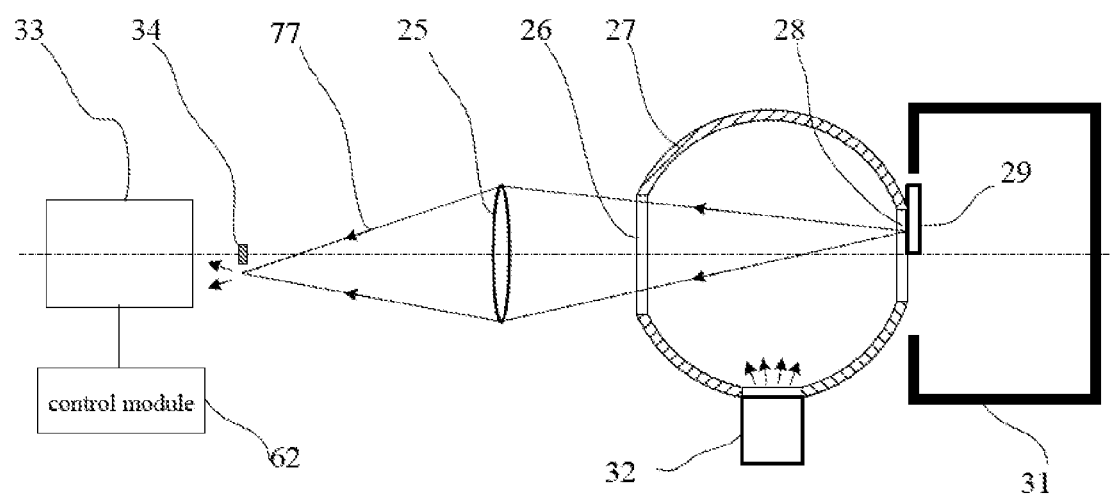
FIG. 17 is a schematic view showing the light paths of the apparatus as illustrated in FIG. 13, according to the fifth embodiment of the present invention.

Step S514, upper and lower reflecting plates 29 and 30 are placed at the sample port, respectively; and measurements are performed twice. This step further includes:

a) As illustrated in FIG. 17, when upper reflecting plate 29 is placed at sample port 28, it is placed at the upper portion of sample port 28; and the lower portion of sample port 28 is hollowed-out. At this time, the reflectance factor of the upper portion of sample port 28 is the same as that of upper reflecting plate 29, and the reflectance factor of the lower portion of sample port 28 is zero; the light emitted from xenon lamp 32, after passing through integrating sphere 27, may irradiate upper reflecting plate 29.

b) When lower reflecting plate 30 is placed at sample port 28, it is placed at the lower portion of sample port 28; and the upper portion of the sample port 28 is hollowed-out. At this time, the reflectance factor of the upper portion of sample port 28 is zero, and the reflectance factor of the lower portion of sample port 28 is the same as that of lower reflecting plate 30; the light emitted from xenon lamp 32, after passing through integrating sphere 27, may irradiate lower reflecting plate 30.

Step S516, the control module of the reflectance measuring instrument analyzes the response signals which are output by the spectrometer due to the diffuse reflectance light, then works out the reflectance factor based on the analysis results and outputs it as a result. The output results of the reflectance factor may be indicated by $R_1(\lambda)$ and $R_2(\lambda)$.

Step S518, the output results $R_{all}(\lambda)$, $R_1(\lambda)$ and $R_2(\lambda)$ are substituted into a transformed formula (1) for the calculation of the non-linear error, a non-linear error calculation formula (10) is derived for the output results.

$$L_{nonlinear}(\lambda) = \frac{R_{all}(\lambda) - [R_1(\lambda) + R_2(\lambda)]}{R_1(\lambda) + R_2(\lambda)} \quad \text{Formula (10)}$$

In formula (10), $L_{nonlinear}(\lambda)$ refers to the non-linear error of the reflectance factor of the reflectance measuring instrument at ½ position of the measuring range; $R_{all}(\lambda)$ refers to the reflectance factor output by the reflectance measuring instrument when the two reflecting plates are placed at the sample port at the same time; $R_1(\lambda)$ refers to the reflectance factor output by the reflectance measuring instrument when the upper reflecting plate is placed at the sample port; and $R_2(\lambda)$ refers to the reflectance factor output by the reflectance measuring instrument when the lower reflecting plate is placed at the sample port.

The absolute measurement method for the non-linear error according to this embodiment, by placing N reflecting plates in the measuring apparatus for the non-linear error, may accomplish an absolute measurement for the non-linear error of the output results of various optical measuring instruments such as a reflectance measuring instrument, a chromaticity measuring instrument and a whiteness meter.

In the absolute measurement of the this embodiment, the reflectance or the chromatic value or the whiteness value in different regions of the sample port of instrument can be directly changed by setting the number of the reflecting plates; and the non-linear error of the output results can be computed by using superposition principle through several measurements, instead of measuring the non-linear error by using the samples with known parameters; whereby avoiding the difficulty in improving the measurement precision of the non-linear error due to the indeterminacy of the nominal values of samples. This absolute measurement comprehensively considers the influence of the non-linear error which is introduced into the measurement results due to various factors such as light path, detector and integrating sphere. Therefore, it can accomplish the measurement for the non-linear error of the final output results of the reflectance measuring instrument while ensuring the accuracy of the non-linear error measurement.

The measurement method for the non-linear error according to this embodiment may also be applicable to the absolute measurement for the non-linear error output by a reflectance measuring instrument under other condition. The detailed description thereof would be omitted herein although they are included within the extension of the present invention.

Sixth Embodiment

The measurement method for the non-linear error according to this embodiment will be explained in conjunction with FIGS. 18 and 19.

Figure 18:
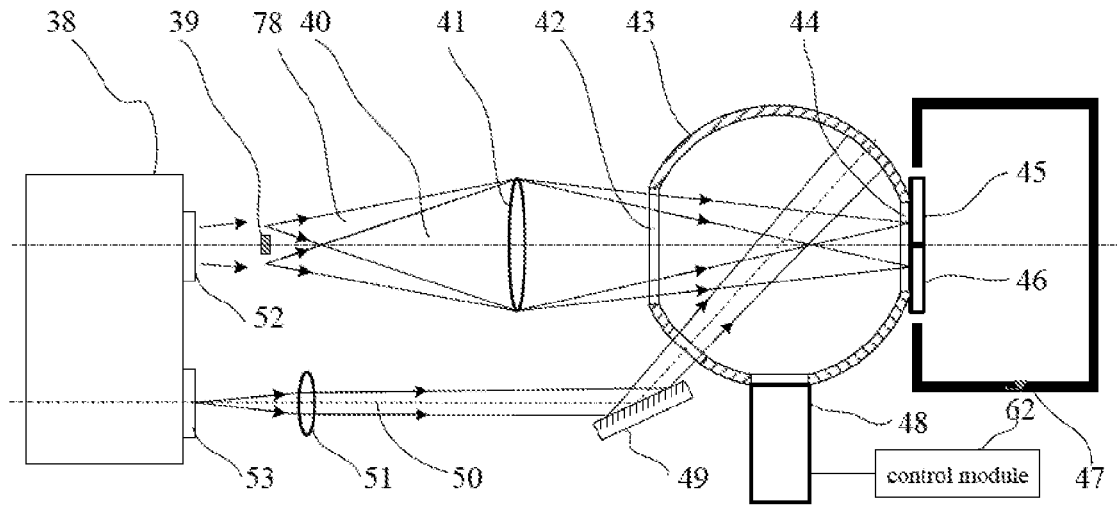
FIG. 18 is a view showing an absolute measurement apparatus for the non-linear error of a reflectance measuring instrument under 0:d condition, having reference light paths, according to a sixth embodiment of the present invention.
Figure 19:
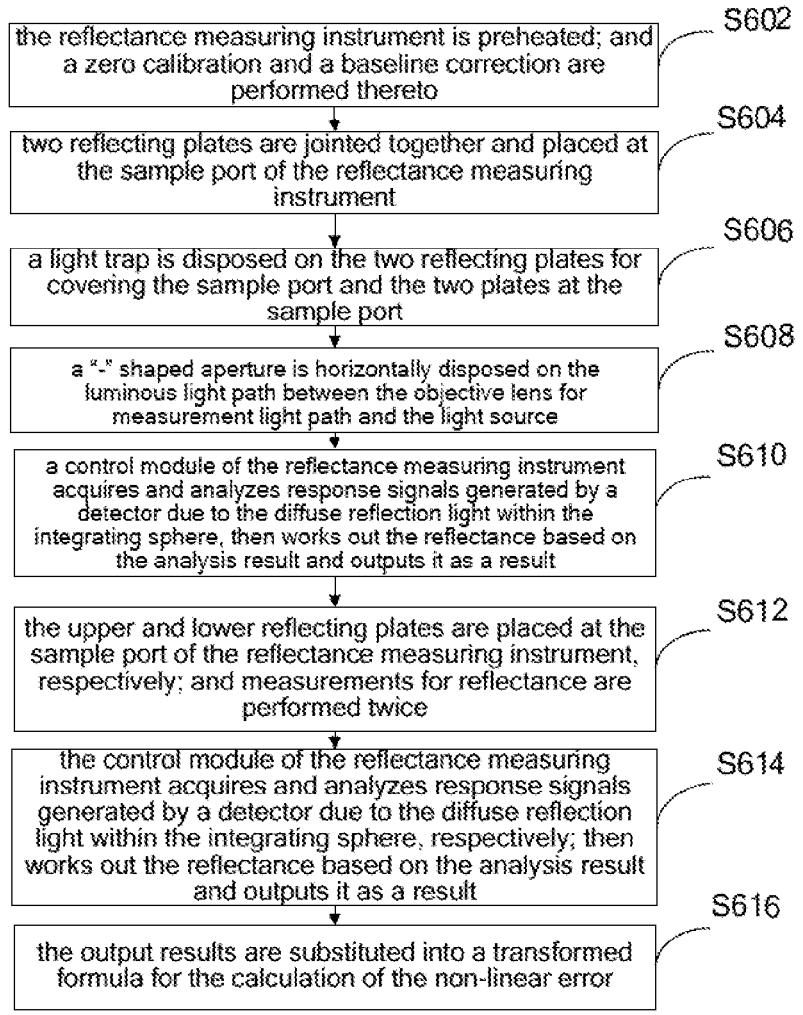
FIG. 19 illustrates a flow chart showing steps of measuring a non-linear error of reflectance by using the apparatus as illustrated in FIG. 18, according to the sixth embodiment of the present invention.

FIG. 18 illustrates an apparatus in which the reflectance measuring instrument under 0:d condition having reference light path measures non-linear error of reflectancen using two reflecting plates, according to this embodiment; FIG. 19 illustrates a flow chart showing steps of measuring the non-linear error by using the apparatus as illustrated in FIG. 18.

The apparatus as illustrated in FIG. 18 may mainly include light paths 78, upper reflecting plate 45 and lower reflecting plate 46. The non-linear error measurement in this embodiment may further employ control module 62 of the reflectance measuring instrument. Light paths 78 of the integrating sphere irradiated reflectance measuring instrument to be measured may mainly include light source 38, an objective lens for measurement light paths 41, integrating sphere 43, detector 48, reflector 49 and an objective lens for reference light path 51. The light emitted from measurement light outlet 52 of light source 38, after passing through the objective lens for measurement light paths 41, may be directed to sample port 44 of integrating sphere 43; the light emitted from reference light outlet 53, after passing through the objective lens for reference light path 51 and reflector 49, may be directed to the inner wall of integrating sphere 43 to form light paths 78. "–" shaped aperture 38 may be placed on a luminous part in the luminous light paths. The light emitted light source 38 may pass the blockage of "–" shaped aperture 39, and then converge on surfaces of upper and lower reflecting plates 45 and 46 through the objective lens for measurement light paths 41. The reflectance measuring instrument under 0:d condition has an ability of measuring spectrum reflectance and the output results thereof are reflectances corresponding to respective wavelengths.

Detailed steps of the absolute measurement of the non-linear error of the reflectances output by the reflectance measuring instrument having the reference light path by using the above apparatus are as follows:

Step S602, the reflectance measuring instrument is pre-heated; and a zero calibration and a baseline correction are performed thereto.

Step S604, two reflecting plates are jointed together and placed at the sample port of the reflectance measuring instrument.

Upper and lower reflecting plates 45 and 46 respectively has the same reflectance, and the same covering area at sample port 44. The number of the reflecting plates is N=2. Each plate has a respective specified position at sample port 44; wherein upper reflecting plate 45 is placed at the upper portion of sample port 44, and lower reflecting plate 46 is placed at the lower portion of sample port 44.

Step S606, light trap 47 is disposed on the two reflecting plates for covering the sample port and the two plates at the sample port.

Step S608, a "–" shaped aperture is horizontally disposed on the luminous light path between the objective lens for measurement light path and the light source.

Step S610, a control module of the reflectance measuring instrument acquires and analyzes response signals generated by a detector due to the diffuse reflectance light within the integrating sphere, then works out the reflectance value based on the analysis result and outputs it as a result.

The result of the reflectance value output by the instrument may be indicated by $R_{all}(\lambda)$, wherein, represents a wavelength.

Step S612, upper and lower reflecting plates 45 and 46 are placed at the sample port of the reflectance measuring instrument, respectively; and measurements for reflectance are performed twice.

Step S614, the control module of the reflectance measuring instrument acquires and analyzes response signals generated by a detector due to the diffuse reflectance light within the integrating sphere, respectively; then works out the reflectance value based on the analysis result and outputs it as a result.

The result of the reflectance value output by the instrument may be indicated by $R_1(\lambda)$ and $R_2(\lambda)$.

Step S616, the output results $R_{all}(\lambda)$. $R_1(\lambda)$ and $R_2(\lambda)$ are substituted into a transformed formula (1) for the calculation of the non-linear error, a non-linear error calculation formula (11) is derived for the output results.

$$L_{nonlinear}(\lambda) = \frac{R_{all}(\lambda) - [R_1(\lambda) + R_2(\lambda)]}{R_1(\lambda) + R_2(\lambda)} \quad \text{Formula (11)}$$

In formula (11), $L_{nonlinear}(\lambda)$ refers to the non-linear error of the reflectancen of the reflectance measuring instrument at ½ position of the measuring range; $R_{all}(\lambda)$ refers to the reflectance value output by the reflectance measuring instrument when the two reflecting plates are placed at the sample port at the same time; $R_1(\lambda)$ refers to the reflectance value output by the reflectance measuring instrument when the upper reflecting plate is placed at the sample port; and $R_2(\lambda)$ refers to the reflectance value output by the reflectance measuring instrument when the lower reflecting plate is placed at the sample port; wherein $\lambda$ represents a wavelength.

The absolute measurement method for the non-linear error according to this embodiment, by placing N reflecting plates in the measuring apparatus for the non-linear error, may accomplish an absolute measurement for the non-linear error of the output results of various optical measuring instruments such as a reflectance measuring instrument, a chromaticity measuring instrument and a whiteness meter. In the absolute measurement of the this embodiment, the reflectance or chromatic value in different regions of the sample port of instrument can be directly changed by setting the number of the reflecting plates; and the non-linear error of the output results can be computed by using superposition principle through several measurements, instead of measuring the non-linear error by using the samples with known parameters; whereby avoiding the difficulty in improving the measurement precision of the non-linear error due to the indeterminacy of the nominal values of samples. This absolute measurement comprehensively considers the influence of the non-linear error which is introduced into the measurement results due to various factors such as light path, detector and integrating sphere. Therefore, it can accomplish the measurement for the non-linear error of the final output results of the reflectance measuring instrument having reference light path while ensuring the accuracy of the non-linear error measurement.

Seventh Embodiment

The measurement method for the non-linear error according to this embodiment will be explained in conjunction with FIGS. 20 and 21.

Figure 20:
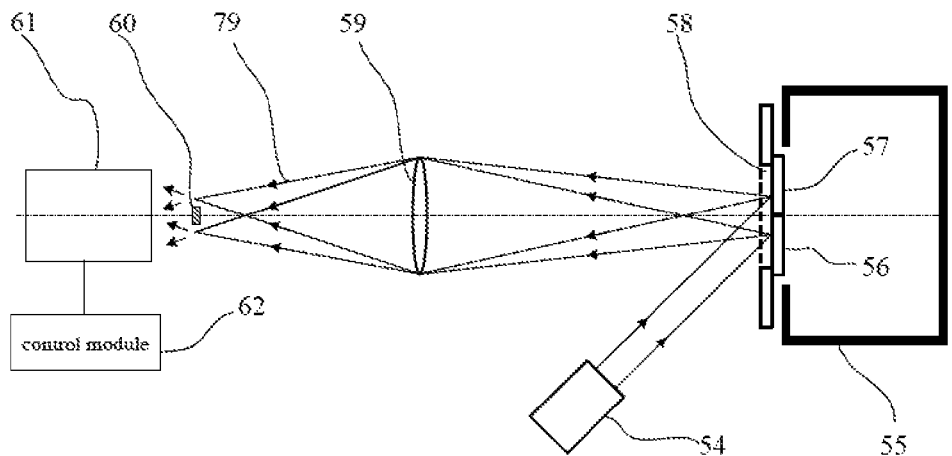
FIG. 20 is a view showing an absolute measurement apparatus for a non-linear error of tristimulus value output by a chromaticity measuring instrument, according to a seventh embodiment of the present invention.
Figure 21:
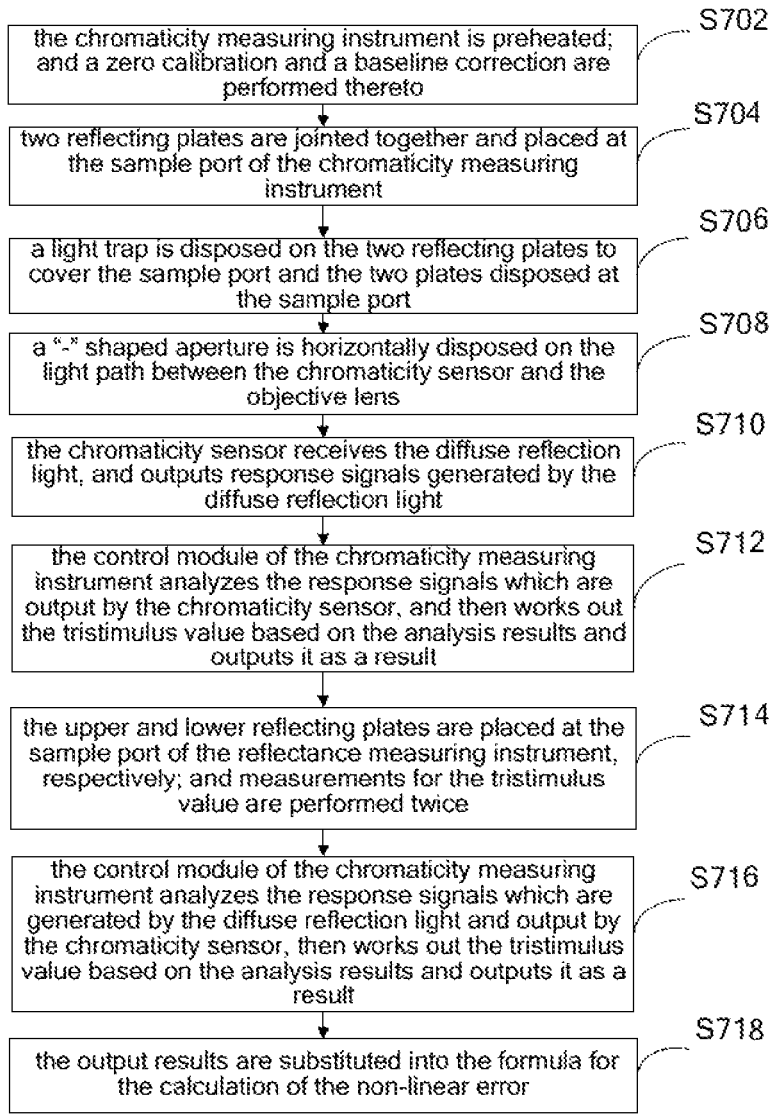
FIG. 21 illustrates a flow chart showing steps of an absolute measurement for a non-linear error by using the apparatus as illustrated in FIG. 20, according to the seventh embodiment of the present invention.

FIG. 20 illustrates an absolute measurement apparatus for a non-linear error of tristimulus value output by a chromaticity measuring instrument, according to this embodiment of the present invention; and FIG. 21 illustrates a flow chart of performing an absolute measurement for a non-linear error by using the apparatus as illustrated in FIG. 20.

As illustrated in FIG. 20, the measurement apparatus may mainly include light paths 79, upper reflecting plate 57 and lower reflecting plate 56. The non-linear error measurement in this embodiment may further employ control module 62 of the chromaticity measuring instrument. Light paths 79 may substantially include light source 54, objective lens 59, sample port 58 and chromaticity sensor 61. The light emitted from light source 54 may irradiate at an angle of 45 degree relative to sample port 58, converge on lower reflecting plate 56 and upper reflecting plate 57, and then enter chromaticity sensor 61 after passing through the objective lens 59. A line between chromaticity sensor 61 and objective lens 59 is perpendicular to sample port 58 to form light path 79. Aperture 60 is disposed on the detecting part in the light path. This apparatus can provide a measurement for the non-linear error of the output results of the chromaticity measuring instrument under 45:0 condition. The output results thereof are tristimulus values.

Detailed steps of measuring the non-linear error of the tristimulus value by using the apparatus as illustrated in FIG. 20 are as follows:

Step S702, the chromaticity measuring instrument is preheated; and a zero calibration and a baseline correction are performed thereto.

Step S704, two reflecting plates are jointed together and placed at the sample port of the chromaticity measuring instrument.

Upper and lower reflecting plates 57 and 56 respectively has the same reflectance factor, and the same covering area at the sample port 44. The number of the reflecting plates is N=2. Each plate has a respective specified position at the sample port; wherein upper reflecting plate 57 is placed at the upper portion of sample port 58, and lower reflecting plate 56 is placed at the lower portion of sample port 58.

Step S706, light trap 55 is disposed on the two reflecting plates for covering the sample port and the two plates disposed at the sample port.

Step S708, "–" shaped aperture 60 is horizontally disposed on the light path between the chromaticity sensor and the objective lens.

As illustrated in FIG. 20, "–" shaped aperture 60 is capable of dividing the detecting light path into upper and lower portions. At this time, the light emitted from light source 54 may irradiate upper and lower reflecting plates 57 and 56 at an angle of 45 degrees; and diffuse reflectance light may enter chromaticity sensor 61 after passing through objective lens 59 and "–" shaped aperture 60.

Step S710, the chromaticity sensor receives the diffuse reflectance light, and outputs response signals generated by the diffuse reflectance light.

Step S712, the control module of the chromaticity measuring instrument analyzes the response signals which are output by the chromaticity sensor, and then works out the tristimulus value based on the analysis results and outputs it as a result.

The output tristimulus value may be indicated by $[X_{all}, Y_{all}, Z_{all}]$, wherein the output tristimulus value after the zero calibration will satisfy $\rho_{all} = [X_{all}, Y_{all}, Z_{all}]$.

Step S714, upper and lower reflecting plates 57 and 56 are placed at the sample port of the chromaticity measuring instrument, respectively; and measurements for the tristimulus value are performed twice. This step further includes:
a) When upper reflecting plate 57 is placed at the upper portion of sample port 58, the lower portion of sample port 58 is hollowed-out; at this time, the reflectance factor of the upper portion of sample port 58 is the same as that of upper reflecting plate 57, and the reflectance factor of the lower portion of sample port 58 is zero.
b) When lower reflecting plate 56 is placed at the lower portion of sample port 58, upper portion of sample port 58 is hollowed-out; at this time, the reflectance factor of the upper portion of sample port 58 is zero, and the reflectance factor of the lower portion of sample port 58 is the same as that of lower reflecting plate 56.

Step S716, the control module of the chromaticity measuring instrument analyzes the response signals which are generated by the diffuse reflectance light and output by the chromaticity sensor, then works out the tristimulus value based on the analysis results and outputs it as a result.

The output results thereof may be indicated by $[X_1, Y_1, Z_1]$ and $[X_2, Y_2, Z_2]$, wherein $[X_1, Y_1, Z_1] = \rho_1$ and $[X_2, Y_2, Z_2] = \rho_2$.

Step S718, the output results $[X_{all}, Y_{all}, Z_{all}]$, $[X_1, Y_1, Z_1]$ and $[X_2, Y_2, Z_2]$ are substituted into the formula (2) for the calculation of the non-linear error.

It will be derived that the non-linear errors $X_{nonlinear}$, $Y_{nonlinear}$ and $Z_{nonlinear}$ of the tristimulus value of the chromaticity sensor with 45:0 light path structure satisfy a formula (12).

$$\begin{cases} X_{nonlinear} = \dfrac{X_{all} - \sum\limits_{i=1\sim M} X_i}{\sum\limits_{i=1\sim M} X_i} \\ Y_{nonlinear} = \dfrac{Y_{all} - \sum\limits_{i=1\sim M} Y_i}{\sum\limits_{i=1\sim M} Y_i} \\ Z_{nonlinear} = \dfrac{Z_{all} - \sum\limits_{i=1\sim M} Z_i}{\sum\limits_{i=1\sim M} Z_i} \end{cases} \quad \text{Formula (12)}$$

The $X_{nonlinear}$, $Y_{nonlinear}$, and $Z_{nonlinear}$ refer to the non-linear error of the tristimulus value, X, Y and Z refer to the output tristimulus value, and i refers to the times of measuring the placed reflecting plates.

The measurement method for the non-linear error according to this embodiment may also be applicable to the absolute measurement for the non-linear error output by a chromaticity measuring instrument under other condition. The detailed description thereof would be omitted herein although they are included within the extension of the present invention.

The absolute measurement method for the non-linear error according to this embodiment, by placing N reflecting plates in the measuring apparatus for the non-linear error, may accomplish an absolute measurement for the non-linear error of the output results of various optical measuring instruments such as a reflectance measuring instrument, a chroma measuring instrument and a whiteness meter and so on. In the absolute measurement of the this embodiment, the reflectance or the chromatic value or the whiteness value in different regions of the sample port of instrument can be directly changed by setting the number of the reflecting plates; and the non-linear error of the output results can be computed by using superposition principle through several measurements, instead of measuring the non-linear error by using the samples with known parameters; whereby avoiding the difficulty in improving the measurement precision of the non-linear error due to the indeterminacy of the nominal values of samples. This absolute measurement comprehensively considers the influence of the non-linear error which is introduced into the measurement results due to various factors such as light path, detector and integrating sphere. Therefore, it can accomplish the measurement for the non-linear error of the final output results of the chromaticity measuring instrument while ensuring the accuracy of the non-linear error measurement.

Eighth Embodiment

Figure 22:
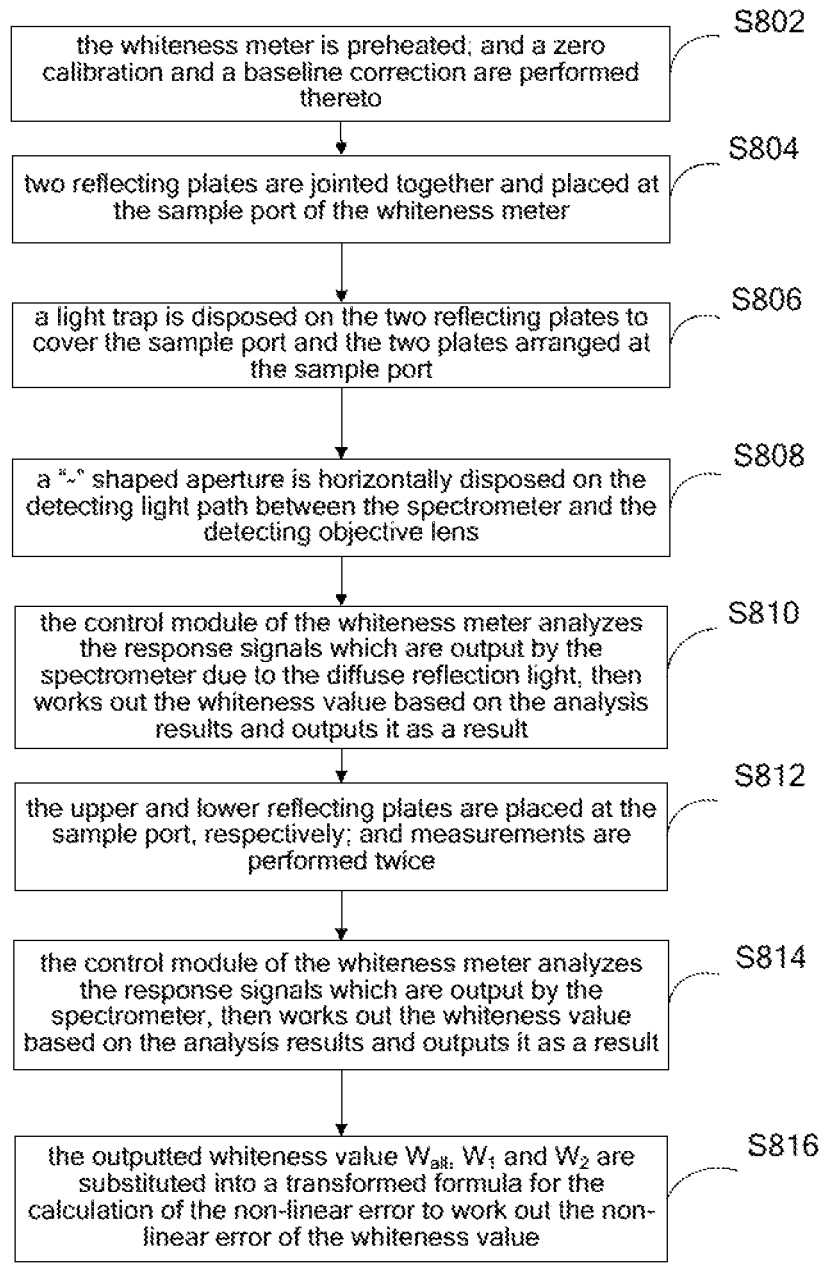
FIG. 22 illustrates a flow chart showing steps of an absolute measurement for a non-linear error of whiteness values output by a whiteness meter, according to a eighth embodiment of the present invention.

FIG. 22 is a flow chart showing steps of an absolute measurement for a non-linear error of whiteness values output by a whiteness meter under d:0 condition by using the apparatus as illustrated in FIG. 13, according to this embodiment. It should be understood that the control module in this embodiment is a control module of the whiteness meter.

The steps of the absolute measurement for the non-linear error of the whiteness value of the output results, according to this embodiment, are as follows:

Step S802, the whiteness meter is preheated, and a zero calibration and a baseline correction are performed thereto.

Step S804, two reflecting plates are jointed together and placed at the sample port of the whiteness meter.

Upper and lower reflecting plates 29 and 30 respectively has a same whiteness value, and the same covering area at sample port 28. The number of the reflecting plates is N=2.

Step S806, a light trap is disposed on the two reflecting plates to cover the sample port and the two plates arranged at the sample port.

Step S808, a "−" shaped aperture is horizontally disposed on the detecting light path between the spectrometer and the detecting objective lens.

As illustrated in FIG. 15, "−" shaped aperture 34 is capable of dividing cross section 37 of the detecting light path into upper and lower portions. As illustrated in FIG. 16, due to the blockage of "−" shaped aperture 34, the detecting light path is divided into two portions at the detecting region of sample port 28; wherein upper and the lower detecting regions 35 and 36 respectively has a same area and detecting sensitivity, and do not cover edges of upper and lower reflecting plates 29 and 30; whereby avoiding the influence on the measurement result of the non-linear error due to the dispersion of light at the edges.

At this time, the light emitted from xenon lamp 32, after passing through integrating sphere 27, may disperse onto upper and lower reflecting plates 29 and 30. The diffuse reflecting light generated by the two reflecting plates, after passing through detecting objective lens 25 and "−" shaped aperture 34, may enter spectrometer 33.

Step S810, the control module of the whiteness meter analyzes the response signals which are output by the spectrometer due to the diffuse reflectance light, then works out the whiteness value based on the analysis results and outputs it as a result.

The results of the whiteness value may indicated by $W_{all}$, and the result output by the whiteness meter upon the calibration will satisfy $\rho_{all} = W_{all}$.

Step S812, upper and lower reflecting plates 29 and 28 are placed at the sample port, respectively; and measurements are performed twice. This step further includes:

a) As illustrated in FIG. 17, when upper reflecting plate 29 is placed at sample port 28, it is placed at the upper portion of sample port 28; and the lower portion of sample port 28 is hollowed-out. At this time, the whiteness value of the upper portion of sample port 28 is the same as that of upper reflecting plate 29, and the whiteness value of the lower portion of sample port 28 is zero.

b) When lower reflecting plate 30 is placed at sample port 28, it is placed at the lower portion of sample port 28; and the upper portion of sample port 28 is hollowed-out. At this time, the whiteness value of the upper portion of sample port 28 is zero; and the whiteness value of the lower portion of sample port 28 is the same as that of lower reflecting plate 30.

Step S814, the control module of the whiteness meter analyzes the response signals which are output by the spectrometer, then works out the whiteness value based on the analysis results and outputs it as a result.

The light emitted from xenon lamp 32, after passing through integrating sphere 27, may irradiate upper reflecting plate 29. At this time, the control module may work out the whiteness value based on the response signals of spectrometer 33. The output whiteness by the control module may indicated by $W_1$, wherein $W_1=\rho_1$. The light emitted from xenon lamp 32, upon the dispersion of integrating sphere 27, may irradiate lower reflecting plate 30. Then the whiteness value result output by the control module 62 may indicated by $W_2$, wherein $W_2=\rho_2$.

Step S816, the output whiteness value $W_{all}$, $W_1$ and $W_2$ are substituted into a transformed formula (2) for the calculation of the non-linear error to work out the non-linear error of the whiteness value.

The non-linear error of the whiteness meter $L_{nonlinear}$ will satisfy a formula (13).

$$L_{nonlinear} = \frac{W_{all} - [W_1 + W_2]}{W_1 + W_2} \qquad \text{Formula (13)}$$

The $L_{nonlinear}$ refers to the non-linear error of the whiteness value output by the whiteness meter; $W_{all}$ refers to the whiteness value output by the whiteness meter when the two reflecting plates are placed at the sample port at the same time; $W_1$ refers to the whiteness value output by the whiteness meter when the upper reflecting plate is placed at the sample port; and $W_2$ refers to the whiteness value output by the whiteness meter when the lower reflecting plate is placed at the sample port.

The absolute measurement method for the non-linear error according to this embodiment, by placing N reflecting plates in the measuring apparatus for the non-linear error, may accomplish an absolute measurement for the non-linear error of the output results of various optical measuring instruments such as a reflectance measuring instrument, a chromaticity measuring instrument and a whiteness meter and so on. In the absolute measurement of the this embodiment, the reflectance or the chromatic value or the whiteness value in different regions of the sample port of instrument can be directly changed by setting the number of the reflecting plates; and the non-linear error of the output results can be computed by using superposition principle through several measurements, instead of measuring the non-linear error by using the samples with known parameters; whereby avoiding the difficulty in improving the measurement precision of the non-linear error due to the indeterminacy of the nominal values of samples. This absolute measurement comprehensively considers the influence of the non-linear error which is introduced into the measurement results due to various factors such as light path, detector and integrating sphere. Therefore, it can accomplish the measurement for the non-linear error of the final output results of the whiteness meter while ensuring the accuracy of the non-linear error measurement.

The measurement method for the non-linear error according to this embodiment may also be applicable to the absolute measurement for the non-linear error output by a whiteness meter under other condition. The detailed description thereof would be omitted herein although they are included within the extension of the present invention.

Ninth Embodiment

Referring to FIGS. 2, 13 and 20 again, the absolute measurement apparatus for the non-linear error of the output result of the optical measuring instrument according to this embodiment will be explained as below:

The measurement apparatus for the non-linear error may include N reflecting plates and a aperture, wherein N is a natural number more than or equal to 2 and preferably less than or equal to 100.

The N reflecting plates jointed together are use to be placed at the sample port of an optical measuring instrument at the same time. Each of reflecting plate has a same covering area at the sample port. The optical measuring instrument includes but is not limited to a reflectance measuring instrument, a chromaticity measuring instrument or a whiteness meter. The output results, output by the optical measuring instrument, corresponding to each N reflecting plate at the same.

The output results of a reflectance measuring instrument may comprise the reflectance, the diffuse reflectance or the reflectance factor; the output results of a chromaticity measuring instrument may comprise the tristimulus value; and the output results of a whiteness meter may comprise a whiteness value. The reflectance refers to a ratio of the luminous flux reflected by the sample to the incident flux, the diffuse reflectance refers to a ratio of the diffuse reflectance component in the luminous flux reflected by the sample to the incident flux; the reflectance factor refers to a ratio of the luminous flux reflected in a direction defined by a specified taper cone to the luminous flux of an ideal diffuse reflector in the same direction; the tristimulus value refers to, in trichromatic system, the three primary colors stimulating amount as required to reach the color matching with the light to be measured; and the whiteness value refers to measurements of a high (light) reflectance and a diffuse surface characteristic of a low color purity.

The apertures are placed along the light paths of the optical measuring instrument, N optical regions corresponding to N reflecting plates are formed at the sample port. None of the N optical regions cover the edges of the reflecting plates outside the sample port. The apertures may be different according to the number N of the reflecting plates. The apertures may be used to divide the optical region into N portions corresponding to the number of the reflecting plates.

In the case that the optical measuring instrument is a reflectance measuring instrument, a chromaticity measuring instrument or a whiteness meter; apertures may be arranged in luminous light paths and/or detecting light paths of the light paths of the reflectance measuring instrument, the chromaticity measuring instrument or the whiteness meter, where integrating sphere is not disposed; N lighting regions or detecting regions corresponding to N reflecting plates are formed at the sample port. When the aperture is arranged in luminous light paths without integrating sphere, each of N lighting regions corresponding to N reflecting plates has a same area and illumination intensity. When the aperture is arranged in detecting light paths without integrating sphere, each of N detecting regions corresponding to N reflecting plates has a same area and detecting sensitivity.

when non-linear error is required to be measured by the optical measuring instrument, N reflecting plates, the number of which has been adjusted according to a position in the measuring range of the optical measuring instrument where the non-linear error is required to be measured, are placed at the sample port; following every adjustment, the optical measuring outputs an output result when the adjusted reflecting plates being placed at the sample port, such that a computation processing for non-linear error is performed to the output result to acquire the non-linear error of the output result of the optical measuring instrument. In this manner, the performance of a non-linear error computation processing to the output results to acquire the non-linear error of the output results of the optical measuring instrument can be achieved by the computation of manual work or a corresponding apparatus.

Preferably, a control module may be disposed in the optical measuring instrument. The control module may be used to receive and analyze the response signals generated by the diffuse reflecting light when the jointed N reflecting plates are placed at the sample port of the optical measuring instrument at the same time, and then acquire output results of the optical measuring instrument based on the analysis results. In addition, the control module may be used to receive and analyze the response signals generated by the diffuse reflecting light when N reflecting plates, the number of which has been adjusted according to a position in the measuring range of the optical measuring instrument where the non-linear error is required to be measured, are placed at the sample port, and then acquire output results of the optical measuring instrument based on the analysis results.

The step of the adjustment of the number of reflecting plates as used according to a measuring range of the optical measuring instrument as required to measure the non-linear error includes: the N reflecting plates jointed together are grouped and placed at the sample port firstly; when the optical measuring instrument measures a non-linear error at a 1/M position of the measuring range, N reflecting plates are then divided into M groups, each of which has N/M reflecting plates; M groups of reflecting plates are placed at the sample port sequentially, wherein N/M reflecting plates of each of M groups are placed specified positions at the sample port. Or, when measuring a non-linear error at a position 1/M of the measuring range of the optical measuring instrument, N reflecting plates are divided into M groups firstly, each of which has N/M reflecting plates; M groups of reflecting plates are placed at the sample port sequentially, wherein N/M reflecting plates in each of M groups are placed specified positions at the sample port; the N reflecting plates jointed together are then grouped and placed at the sample port. N is integer times of M. The specified positions are positions where the N/M reflecting plates in each of M groups are located in the N reflecting plates when the N reflecting plates jointed together are placed at the sample port of the optical measuring instrument simultaneously.

It should be understood that connection position between the control module of the measured optical measuring instrument and the measurement apparatus for non-linear error will be different according to the output results of the measured optical measuring instrument. When the output results of the measured optical measuring instrument are reflectance or diffuse reflectance, the measurement apparatus for non-linear error is that as illustrated in FIG. 2 and the control module is connected to a detector. When the output results of the measured optical measuring instrument are reflectance factor or whiteness value, the measurement apparatus for the non-linear error is that as illustrated in FIG. 13 and the control module is connected to a spectrometer. When the output results of the measured optical measuring instrument are tristimulus values, the measurement apparatus for non-linear error is that as illustrated in FIG. 20 and the control module is connected to a chromaticity sensor.

In this embodiment, by placing N reflecting plates in the measuring apparatus for the non-linear error, the absolute measuring method for the non-linear error can accomplish an absolute measurement for the non-linear error of the output results of various optical measuring instruments such as a reflectance measuring instrument, a chromaticity measuring instrument and a whiteness meter and so on. In the absolute measurement of the this embodiment, the reflectance or the chromatic value or the whiteness value in different regions of the sample port of instrument can be directly changed by setting the number of the reflecting plates; and the non-linear error of the output results can be computed by using superposition principle through several measurements, instead of measuring the non-linear error by using the samples with known parameters; whereby avoiding the difficulty in improving the measurement precision of the non-linear error due to the indeterminacy of the nominal values of samples. This absolute measurement comprehensively considers the influence of the non-linear error which is introduced into the measurement results due to various factors such as light path, detector and integrating sphere. Therefore, it can accomplish the measurement for the non-linear error of the final output results of the optical measuring instrument while ensuring the accuracy of the non-linear error measurement.

Preferably, the measurement apparatus for the non-linear error may further include a light trap disposed on the reflecting plates at the sample port of the instrument, when N reflecting plates are jointed together, so as to cover the sample port of the instrument and the reflecting plates disposed at the sample port.

By providing the light trap on the reflecting plates, the preferred measurement apparatus for the non-linear error may absorb the light transmitted through the hollowed-out portion of the sample port. This may avoid the light reflection on the hollowed-out portion of the sample port, so that the non-linear error of the output results of the optical measuring instrument as measured becomes more accurate.

The embodiments in the description have been explained step by step. Any one of the embodiments has only emphasized the differences from others, and the same or similar explanations of each embodiment could be made reference to each other. Since the embodiments about apparatus are substantially similar to those about corresponding methods, the explanations thereof are relatively brief and could be seen also in those embodiments about corresponding methods.

The absolute measurement method and apparatus for the non-linear error according to the present invention has been discussed in detail above. The principles and embodiments of the invention are described by way of particular examples herein, and the above embodiments are explained only for the purpose of facilitating the understanding of the method and the substantial concept. Meanwhile, it will be obvious to those skilled in the art that various modifications would be made within the scope of the embodiments and the applications according to the concept of the present invention. Therefore, the description should not be constructed to limit the present invention.

I claim:

1. An absolute measurement method for non-linear error, comprising:
   placing N reflecting plates jointed together at a sample port of an optical measuring instrument at the same time, wherein each of reflecting plates has a same covering area at the sample port and N is a natural number more than or equal to 2;
   placing an aperture along light paths of the optical measuring instrument;
   forming N optical regions corresponding to N reflecting plates at the sample port, wherein none of the N optical regions cover the edges of the reflecting plates;
   adjusting the number of the reflecting plates as used according to a position in the measuring range of the optical measuring instrument where the non-linear error is required to be measured;
   acquiring the output results of the optical measuring instrument when the adjusted reflecting plates are placed at the sample port following every adjustment;
   wherein the N reflecting plates jointed together and placed at the sample port firstly; when measuring a non-linear error at a 1/M position of the measuring range of the optical measuring instrument, N reflecting plates are then divided into M groups, and each of which has N/M reflecting plates; M groups of reflecting plates are placed at the sample port sequentially, wherein N/M reflecting plates in each of M groups are placed in specified positions at the sample port, or when measuring a non-linear error at a 1/M position of the measuring range of the optical measuring instrument, N reflecting plates are then divided into M groups, and each of which has N/M reflecting plates; M groups of reflecting plates are placed at the sample port sequentially, wherein N/M reflecting plates in each of M groups are placed in specified positions at the sample port; the N reflecting plates jointed together and placed at the sample port, wherein N is integer times of M; the specified positions are positions where the N/M reflecting plates in each of M groups are located in N reflecting plates when N reflecting plates jointed together are placed at the sample port of the optical measuring instrument simultaneously;

performing a computation processing for non-linear error to the output results; and acquiring the non-linear error of the output results of the optical measuring instrument.

2. The method according to claim 1, wherein the optical measuring instrument is a reflectance measuring instrument, a chromaticity measuring instrument or whiteness meter;

when the optical measuring instrument is a reflectance measuring instrument, the output results comprise a reflectance, a diffuse reflectance, or a reflectance factor;

when the optical measuring instrument is a chromaticity measuring instrument, the output results comprise a tristimulus value; and when the optical measuring instrument is a whiteness meter, the output results comprise a whiteness value.

3. The method according to claim 2, wherein when the optical measuring instrument is the reflectance measuring instrument, the chromaticity measuring instrument or the whiteness meter, disposing the aperture on luminous light paths and/or detecting light paths of the light paths of the reflectance measuring instrument, the chromaticity measuring instrument or the whiteness meter, where an integrating sphere is not disposed; and forming N lighting regions or detecting regions corresponding to N reflecting plates at the sample port.

4. The method according to claim 3, wherein when the aperture is disposed on the luminous light paths without integrating sphere, each of N lighting region corresponding to N reflecting plates has a same area and illumination intensity; when the aperture is disposed on the detecting light paths without integrating sphere, each N detecting region corresponding to N reflecting plates has a same area and detecting sensitivity.

5. The method according to claim 1, wherein after N reflecting plates jointed together are placed at the sample port of the optical measuring instrument at the same time, further comprising:

disposing a light trap on the reflecting plates for covering the sample port and the reflecting plates.

6. The method according to claim 1, wherein each N reflecting plate has a same reflectance, diffuse reflectance, reflectance factor, tristimulus value or whiteness value.

7. The method according to claim 1, wherein a lower limit of the measuring range is defined by an output result of the optical measuring instrument with no reflecting plate placed; and an upper limit of the measuring range is defined by an output result of the optical measuring instrument when N reflecting plates jointed together are placed at the sample port of the optical measuring instrument at the same time.

8. An absolute measurement apparatus for non-linear error, comprising N reflecting plates and an aperture, wherein N is a natural number more than or equal to 2;

wherein N reflecting plates are configured to be jointed together and then placed at a sample port of an optical measuring instrument at the same time; wherein each reflecting plate has a same covering area at the sample port;

the aperture is configured to be disposed on a light path of the optical measuring instrument; N optical regions corresponding to the N reflecting plates are formed at the sample port, wherein none of N optical regions cover the edges of the reflecting plates; and when the non-linear error is required to be measured by the optical measuring instrument, the number of the reflecting plates are adjusted according to a position in the measuring range of the optical measuring instrument where the non-linear error is required to be measured, then the reflecting plates are placed at the sample port; following every adjustment, wherein the N reflecting plates jointed together and placed at the sample port; when measuring a non-linear error at a 1/M position of the measuring range of the optical measuring instrument, N reflecting plates are then divided into M groups, and each of which has N/M reflecting plates; M groups of reflecting plates are placed at the sample port sequentially, wherein N/M reflecting plates in each of M groups are placed in specified positions at the sample port, or when measuring a non-linear error at a 1/M position of the measuring range of the optical measuring instrument, N reflecting plates are then divided into M groups, and each of which has N/M reflecting plates; M groups of reflecting plates are placed at the sample port sequentially, wherein N/M reflecting plates in each of M groups are placed in specified positions at the sample port; the N reflecting plates jointed together and placed at the sample port, wherein N is integer times of M; the specified positions are positions where the N/M reflecting plates in each of M groups are located in N reflecting plates when N reflecting plates jointed together are placed at the sample port of the optical measuring instrument simultaneously;

the optical measuring outputs an output result when the adjusted reflecting plates being placed at the sample port, such that a computation processing for non-linear error is performed to the output result to acquire the non-linear error of the output result of the optical measuring instrument.

9. The apparatus according to claim 8, further comprising a light trap disposed on the reflecting plates for covering the sample port and the reflecting plates.

10. The apparatus according to claim 8, wherein the optical measuring instrument is a reflectance measuring instrument, a chromaticity measuring instrument or whiteness meter;

when the optical measuring instrument is the reflectance measuring instrument, the chromaticity measuring instrument or the whiteness meter, the aperture is disposed on luminous light paths and/or detecting light paths of the light paths of the reflectance measuring instrument, the chromaticity measuring instrument or the whiteness meter, where an integrating sphere is not disposed; and N lighting regions or detecting regions corresponding to N reflecting plates are formed at the sample port.

11. The apparatus according to claim 8, wherein a control module is disposed in the optical measuring instrument; and
- the control module is capable of receiving and analyzing a response signal generated by a diffuse reflecting light when the jointed N reflecting plates are placed at the sample port of the optical measuring instrument at the same time, and then acquiring an output result of the optical measuring instrument based on the analysis result; and
- the control module is capable of receiving and analyzing the response signal generated by a diffuse reflecting light when the number of the reflecting plates has been adjusted according to the position in the measuring range of the optical measuring instrument where the non-linear error is required to be measured and the reflecting plates are placed at the sample port, and then acquiring an output result of the optical measuring instrument based on the analysis result.

12. The apparatus according to claim 8, wherein a lower limit of the measuring range is defined by an output result of the optical measuring instrument with no reflecting plate placed; and an upper limit of the measuring range is defined by an output result of the optical measuring instrument when N reflecting plates jointed together are placed at the sample port of the optical measuring instrument at the same time.

* * * * *